United States Patent [19]

D'Avello et al.

[11] Patent Number: 4,831,647
[45] Date of Patent: May 16, 1989

[54] RADIOTELEPHONE CREDIT CARD DATA COMMUNICATIONS

[75] Inventors: Robert F. D'Avello, Hoffman Estates; Daniel S. Rokusek, Schaumburg; Francis P. Tobolski, Jr., Algonquin, all of Ill.

[73] Assignee: Motorola, Inc., Schaumburg, Ill.

[21] Appl. No.: 57,478

[22] Filed: Jun. 2, 1987

[51] Int. Cl.[4] .............................................. H01M 1/57
[52] U.S. Cl. .......................................... 379/91; 379/59; 379/144
[58] Field of Search ...................... 379/91, 58, 59, 144

[56] References Cited

U.S. PATENT DOCUMENTS

| | | |
|---|---|---|
| 3,539,924 | 11/1970 | Daskalakis et al. . |
| 3,576,402 | 4/1971 | Baker et al. . |
| 4,312,074 | 1/1982 | Pantler et al. . |
| 4,354,252 | 10/1982 | Lamb et al. . |
| 4,399,330 | 8/1983 | Kuenzel ................................ 379/58 |
| 4,411,017 | 10/1983 | Talbot .................................... 455/26 |
| 4,439,636 | 3/1984 | Newkirk et al. . |
| 4,517,412 | 5/1985 | Newkirk et al. . |
| 4,517,669 | 5/1985 | Freeburg et al. . |
| 4,562,341 | 12/1985 | Ohmae et al. . |
| 4,577,061 | 3/1986 | Katzeff et al. ...................... 379/144 |
| 4,590,365 | 5/1986 | Okada . |
| 4,590,473 | 5/1986 | Burke et al. . |
| 4,595,983 | 6/1986 | Gehalo et al. . |
| 4,625,276 | 11/1986 | Benton et al. ....................... 364/408 |
| 4,636,791 | 1/1987 | Burke et al. . |
| 4,640,986 | 2/1987 | Yotsutano et al. . |
| 4,650,978 | 3/1987 | Hudson et al. . |
| 4,677,657 | 6/1987 | Nagata et al. . |
| 4,706,275 | 11/1987 | Kamil .................................. 379/144 |
| 4,715,061 | 12/1987 | Norwich .............................. 379/91 |
| 4,727,569 | 2/1988 | Kutreib et al. ...................... 379/58 |
| 4,731,818 | 3/1988 | Clark, Jr. et al. ................... 379/144 |
| 4,776,003 | 10/1988 | Harris .................................. 379/91 |
| 4,777,646 | 10/1988 | Harris .................................. 379/91 |

FOREIGN PATENT DOCUMENTS 57-80838  5/1982  Japan ................................... 379/59

OTHER PUBLICATIONS

Fluhr et al., "Control Architecture: Bell System Technical Journal", vol. 58, No. 1; Jan. 1979; pp. 43–69.
Texas Instruments Information Publishing Center, "Understanding Data Communications", 1984, pp. 167–170.
Intel Corporation, "Microsystem Components Handbook", 1985, pp. 6-20 to 6-47 and 6-228 to 6-249.

*Primary Examiner*—Robert Lev
*Attorney, Agent, or Firm*—Raymond A. Jenski; Rolland R. Hackbart; Donald B. Southard

[57] ABSTRACT

Method and apparatus for communicating credit card information read at a mobile radiotelephone unit is disclosed. Data read from a credit card is placed in a variable length error protected format and transmitted from the mobile radiotelephone unit to authorize payment of the radiotelephone call.

20 Claims, 19 Drawing Sheets

209

RADIOTELEPHONE CREDIT CARD DATA COMMUNICATIONS

BACKGROUND OF THE INVENTION

This invention relates generally to radiotelephone systems and equipment and more particularly to the method and apparatus used to communicate credit card information in a radiotelephone system in which a credit card is used to prepay for the radiotelephone call. This invention is related to U.S. patent application Nos. 057,402 (D'Avello et al.) and 057,479 (D'Avello et al.), each filed on the same date as the present invention and containing related subject matter.

Widespread mobile telephone service such as that afforded by cellular mobile telephone systems enables large numbers of users to have radiotelephone service in their vehicles. It has become desirable to extend mobile telephone service to other public transportation services such as taxicabs, bus, railroad, and rent-a-car services. Additionally, temporary fixed installation of radiotelephone service such as at trade shows or fairgrounds has become desirable. In so extending the service, those entities providing the service must address the problem of collecting payment for the telephone service provided Collection of coin and currency in pay phones placed on inter-urban trains has been known for a long time but adequate compensation for a long distance call or a call of long duration is often times difficult to collect in such a pay phone. The advent of credit cards with magnetic or other means of data storage has enabled the credit caller the opportunity to charge his calls to his credit card thereby assuring the telephone service provider payment for toll or metered telephone calls.

Generally, the procedure for enabling the credit card telephone is to have the potential user run his credit card through a magnetic stripe reader. This first step reads at least one "track" of the magnetic stripe (usually "track two") which includes, inter alia, identification of the card and expiration date. Further definition of magnetic stripe encoding may be found in ANSI X4.16-1983 "American National Standard for Financial Services - Financial Transaction Cards - Magnetic Stripe Encoding". A telephone call is then placed to the credit call provider and the track two information is read to the computer of the credit call provider. A check is then made of the card validity and expiration date and if no reason exists for denying service, a single telephone call is allowed. In this form, the operation is similar to that of an automatic teller machine (ATM). The single telephone call is dialled by the credit user to the computer (or telephone switch) of the credit call provider which subsequently redials the call to the public switched telephone network (PSTN). When the user terminates his call, the credit call provider senses the end of the call. The credit call provider can then calculate directly the duration of the call, any toll or metered charges, and any air time charges accumulated through the use of radiotelephone circuits. The disadvantage of this operation is that the credit call provider must maintain telephone switching equipment which must redial the user's call and must procure adequate input and output telephone trunks to carry the expected amount of telephone traffic.

Others have suggested that the credit call provider only needs to monitor the start and completion times of the user correlated to the particular mobile unit used in making the credit card call. In fact, a properly synchronized credit card mobile telephone system would need only the starting time (or the completion time) of each credit card use and the mobile telephone unit identification. Any calls made between the starting time of a first credit card authorization and the starting time of a second credit card authorization would be billed to the first credit card. Thus, the credit call provider would not have to maintain a telephone switch or lease a large number of input and output telephone trunks. It is not clear, however, that the equipment which interfaces with the credit card user can provide a telephone service which appears to the user to operate in a "normal" telephone mode, with each telephone call being made in a consistent and familiar manner.

In other credit call schemes, modifications have been suggested to the standard signalling protocol of the radiotelephone system which create a non-standard system. Further, if a standard system of signalling is maintained, it is desirable that a credit card data transmission technique be employed which correctly transmits the credit card information error free.

SUMMARY OF THE INVENTION

Therefore, one object of the present invention is to read and communicate credit card information from a mobile radiotelephone unit to a registration computer.

Another object of the present invention is to transmit the credit card information with a minimum of errors.

A further object of the present invention is to reduce the message length of the data transmission.

Accordingly, these and other objects are achieved in the present invention which encompasses the method and apparatus for reading a credit card identification number at a mobile radiotelephone unit and creating a data field from the read identification number. A message is subsequently generated for radio transmission from the mobile unit and utilizes a format which comprises an opening flag of at least one SOH character, a data length character, a message type character, the identification number data field, at least one cyclic redundancy code character, and at least one longitudinal redundancy check character.

DESCRIPTION OF THE PREFERRED EMBODIMENT

Figure 1:
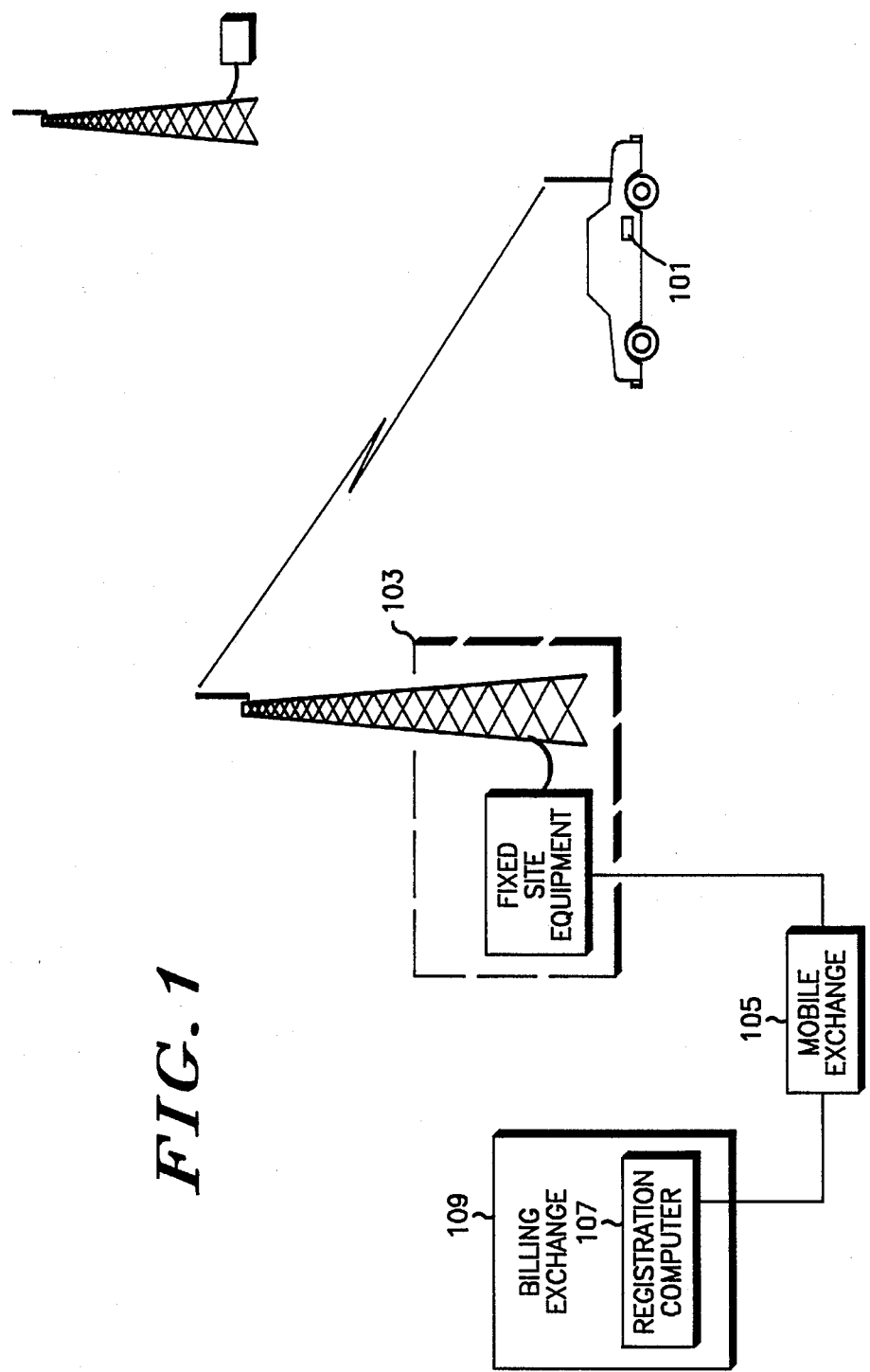
FIG. 1 is a diagram showing a system which may employ the present invention.

A greatly simplified illustration of a radiotelephone system which might employ the present invention is shown in FIG. 1. A mobile unit 101 within radio transmission and reception range of a fixed site 103 which typically includes one or more radio transmitters, one or more radio receivers, antennas and transmission facilities, site computer control equipment, and interconnection to a mobile telephone exchange 105. Such fixed site equipment may be of the type described in "Dyna T*A*C LD Series Cellular Mobile Telephone Integrated Base Station", Instruction Manual No. 68P81060E30-C, 1986, Motorola Technical Writing Services, 1301 E. Algonquin Road, Schaumburg Ill. 60196. A mobile telephone exchange may be of the EMX type described in Instruction Manual No. 68P81052E05-A, 1985, Motorola Technical Writing Services, 1301 E. Algonquin Road, Schaumburg Illinois 60196.

The mobile exchange 105 switches calls between mobile telephone units and between the land line public switched telephone network (PSTN) and mobile units such that the operation is virtually indistinguishable from standard telephone operation. In a cellular mobile telephone system, a plurality of fixed sites may be connected to one or more mobile exchanges which further serve to mediate handoff of a radiotelephone call as the mobile unit travels from one radio coverage area to another.

In a radiotelephone system which provides pay telephone service by using conventional credit cards as the means for extending credit to the radiotelephone user, it is necessary to check the validity of the credit card (the paying history, maximum credit to be extended, expiration date, etc.) before authorizing the credit extension. Further, some technique of monitoring the call duration and other charges which are accumulated against the telephone call and applying the charges (correctly) against the right credit card must be employed. Such tasks are assigned, in the present invention, to a registration computer 107 which may be a part of a separate billing exchange 109, part of the mobile exchange 105, or a stand-alone computer accessed by predetermined telephone trunks assigned certain telephone numbers. The present invention addresses the third alternative in the discussion of the preferred embodiment although the invention may be employed in the first and second alternatives as well.

The mobile unit typically would include a mobile transceiver and a control unit having special adaptation for using credit card reading devices. A cellular mobile transceiver suited for use with the present invention is described in "Dyna T*A*C Cellular Mobile Telephone", Instruction Manual No. 68P81066E40-C, 1985, Motorola Technical Writing Services, 1301 E. Algonquin Road, Schaumburg Ill. 60196. A generalized block diagram of a mobile unit is shown in FIG. 2.

Figure 2:
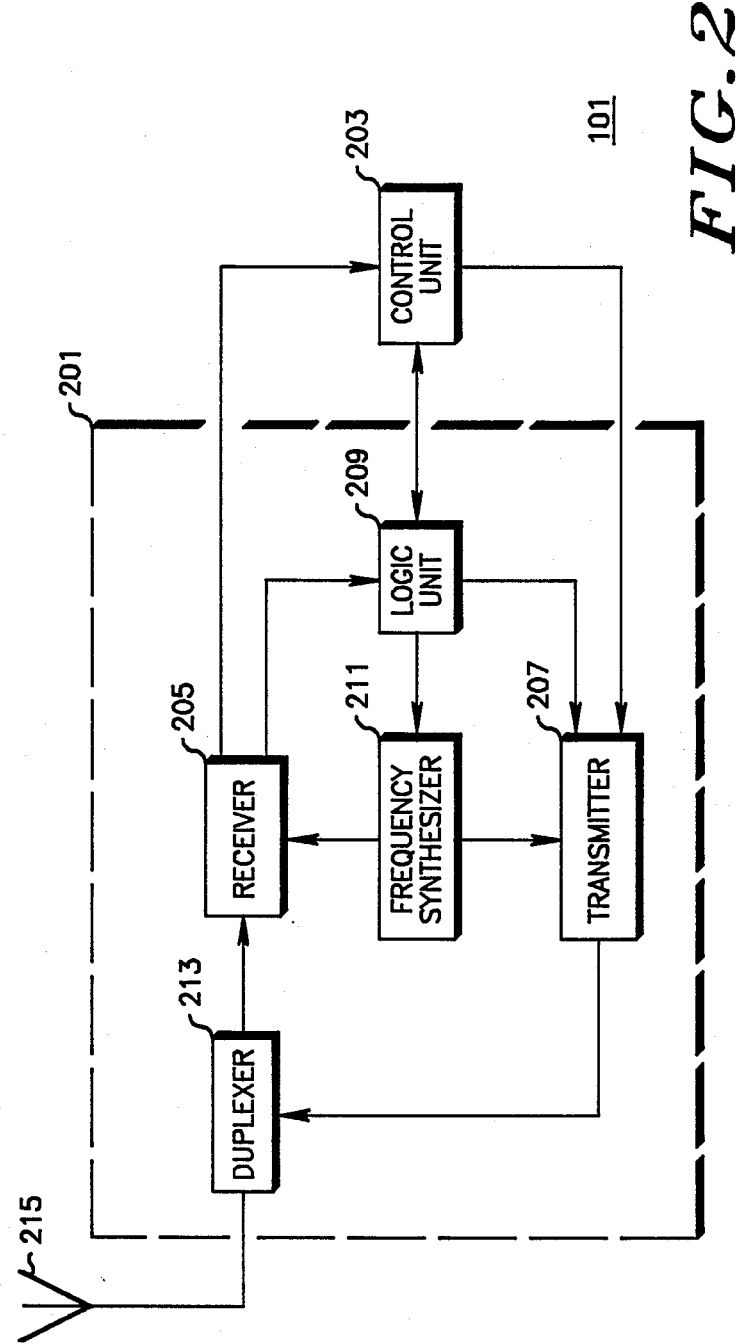
FIG. 2 is a block diagram of a mobile unit for use in the system of FIG. 1 and which may employ the present invention.

In FIG. 2, a mobile transceiver 201 is coupled to a control unit 203 to provide the essential functioning elements of the mobile unit 101. The primary user interface will be with the control unit 203 as he provides his credit card for identification, dials telephone numbers, listens, and speaks. The control unit 203 will be described in more detail below. The mobile transceiver 201 consists of the basic blocks of a radio receiver 205, a radio transmitter 207, a logic unit 209 (which coordinates the activities of the receiver 205, transmitter 207, and control unit 203 and which utilizes a microcomputer to process and maintain radiotelephone calls), a frequency synthesizer 211 (which, under the direction of the logic unit 209, selects the proper operating frequency of the receiver 205 and the transmitter 207), and a duplexer 213 (which couples the receiver 205 and the transmitter 207 to an antenna 215).

Figure 3:
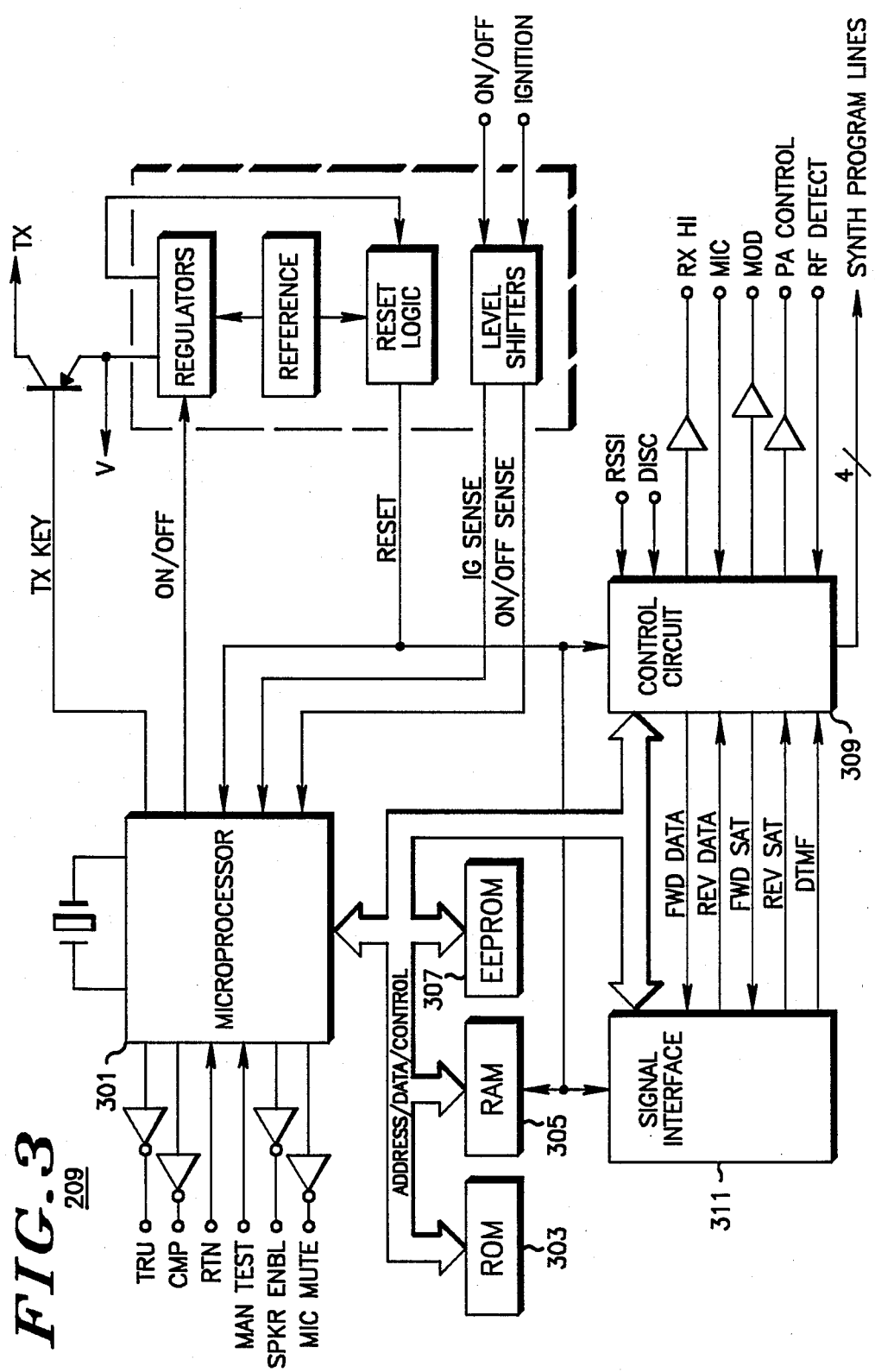
FIG. 3 is a block diagram of a logic unit which may be utilized in the mobile unit of FIG. 2 and which may employ the present invention.

The logic unit 209 of the mobile transceiver 201 is further described in the block diagram of FIG. 3. A microprocessor 301 (which may be a type 68HC11 or similar device) utilizes ROM 303, RAM 305, and EEPROM 307 memory to process and store the necessary program steps and input and output data for control of the remote unit in the cellular system. Interface to the radio frequency components (receiver 205, transmitter 207, and synthesizer 211) is realized through a control circuit 309 which further has the capability of providing received data and received supervisory audio tones (SAT) to a signal interface circuit 311. The signal interface 311, under control of microprocessor 301, provides data, SAT, and dialing tone (DTMF) direction to control circuit 309 for subsequent transmission by transmitter 207. Data and control interface is realized from microprocessor 301 to the control unit 203 via bus lines TRU, CMP, and RTN in a manner more fully described in U.S. Pat. No. 4,369,516. Similar interface between a transceiver logic unit and associated control unit are described in U.S. Pat. Nos. 4,398,265 and 4,486,624.

Figure 4:
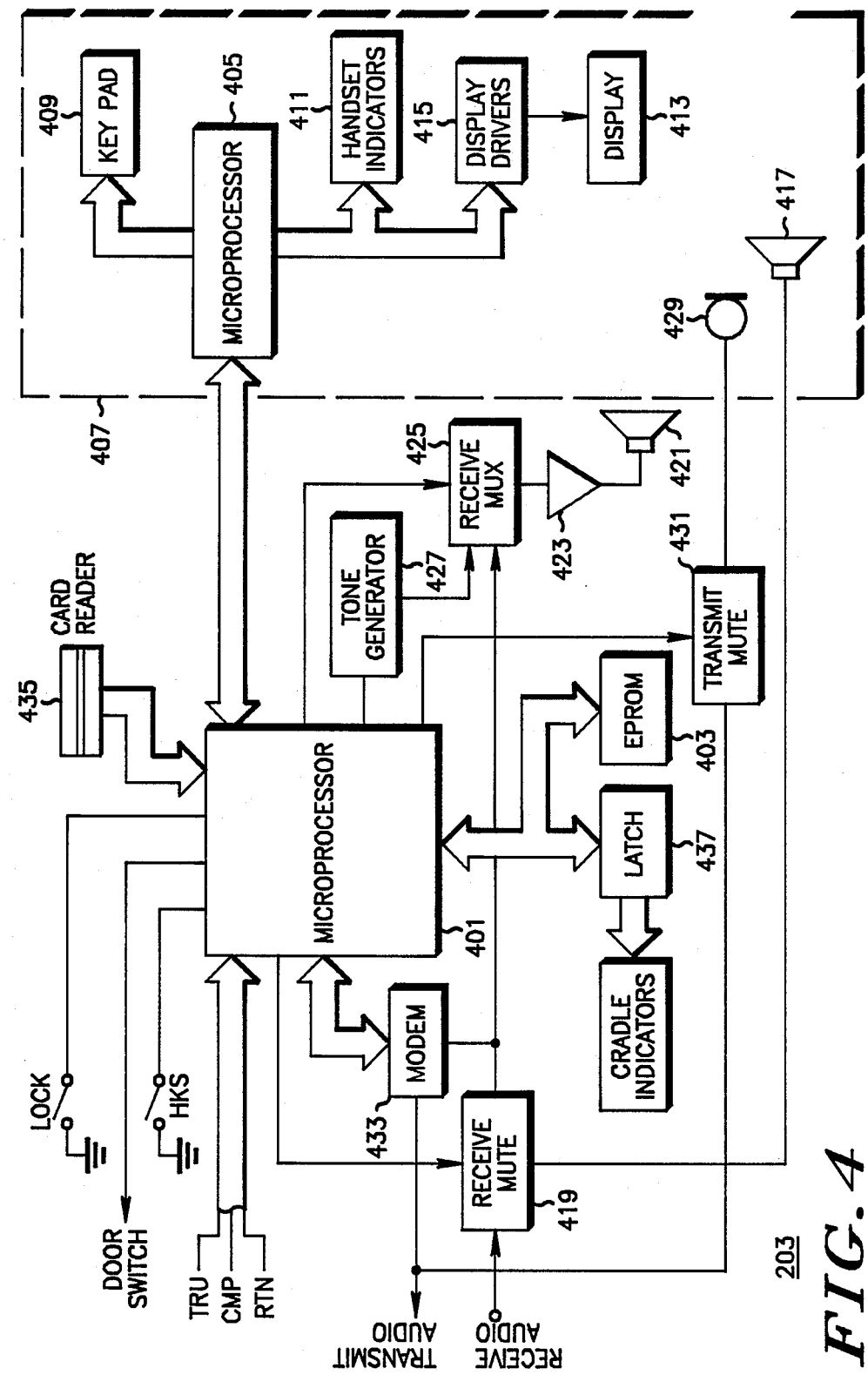
FIG. 4 is a block diagram of a control unit for the mobile unit of FIG. 2 and which may employ the present invention.

The control unit 203 is shown in block diagram form in FIG. 4. A cradle microprocessor 401 (which may be a 68HC11 or equivalent type having internal EEPROM) is coupled to the three wire bus lines TRU, CMP, and RTN from the logic unit 209 microprocessor 301 and executes the program steps stored in EPROM memory 403. A second microprocessor 405 is located in a handset portion 407 of the control unit and communicates with the cradle microprocessor 401 via another three wire bus. The handset microprocessor 405 strobes the pushbutton keys of a telephone dialing keypad 409 for any dialing activity by the user and provides output information to handset indicators 411 and a multidigit display 413 through display drivers 415.

Audio is routed from the radio receiver 205 to the transducer 417 in the handset via the receiver mute switch 419 and multiplexer 425 in the cradle (which is controlled by the cradle microprocessor 401). The received audio is also routed to the cradle speaker 421 via audio amplifier 423 and multiplexer 425 for inclusion of user feedback generated by tone generator 427.

Audio is routed from the handset microphone 429 through cradle microprocessor 401 controlled muting switch 431 to the radio transmitter 207 for transmission. Data for registration and control generated by microprocessor 401 for transmission is converted to a radio-compatible format by modem 433. Data received by the radio receiver 205 during the registration sequence and other credit card control processes is converted by modem 433 and presented to cradle microprocessor 401 for further processing.

Information is read from the appropriate track of a magnetically encoded credit card stripe by a conventional card reading mechanism 435. This information is presented to the cradle microprocessor 401 for use which will be described later. Additional inputs are received from the handset on-hook/off-hook hook-switch (HKS), vehicle door switch, and telephone lock switch. Indicators on the cradle are driven by cradle microprocessor 401 via latch circuit 437.

Figure 5:
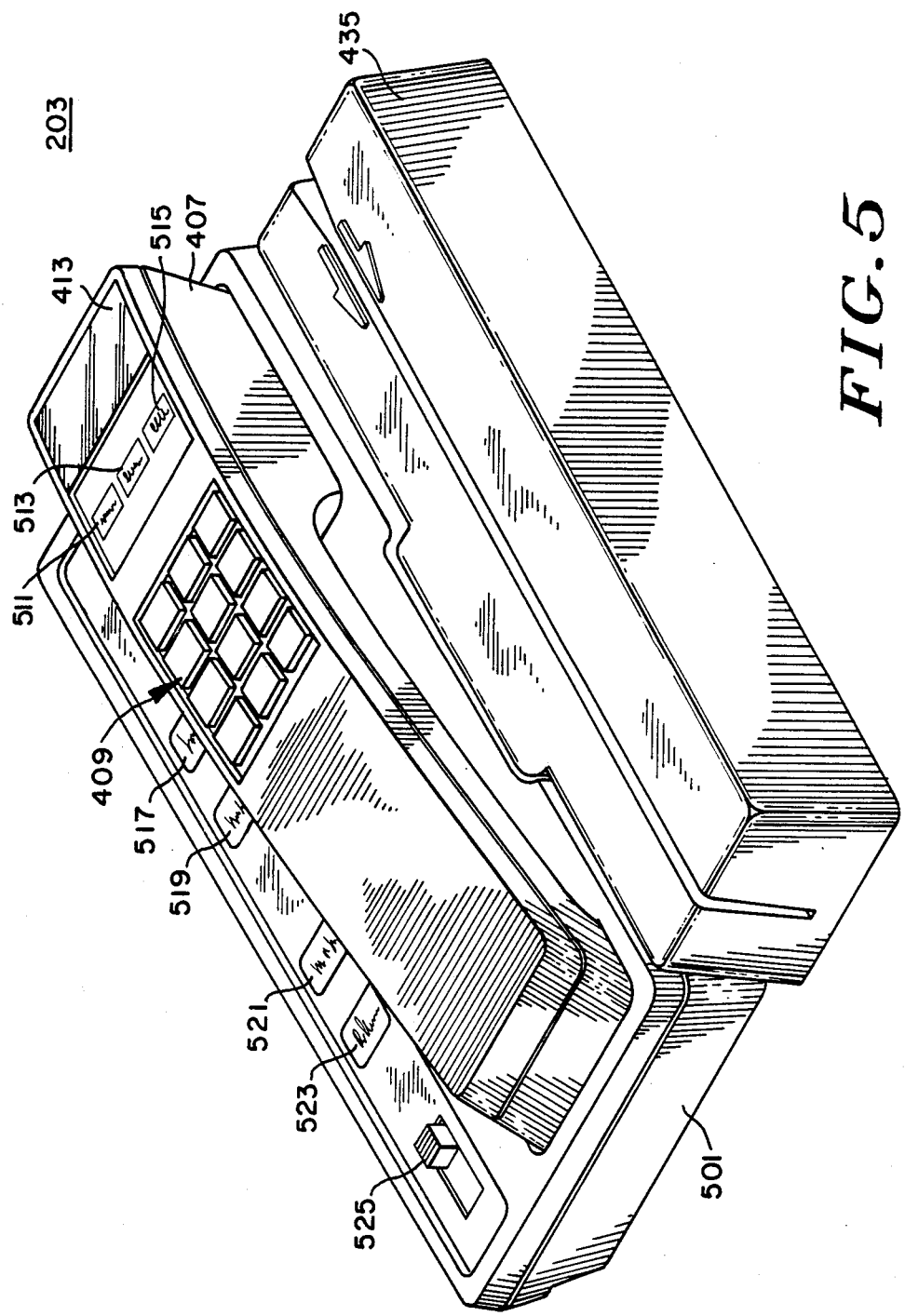
FIG. 5 is a physical design of the control unit of FIG. 4.

One physical implementation of a control unit 203 is shown diagramatically in FIG. 5. This unit is similar to that shown in U.S. patent application No. 042,787 filed on Apr. 27, 1987 in behalf of Pulio, et al. The control unit may consist of a cradle 501, a handset 407, and a magnetic stripe card reader 435. Of particular interest to the user are the keypad 409 (which utilizes, in the preferred embodiment, 12 keys corresponding to the numbers 0 through 9 and the "*" and "#" keys arranged in standard telephone orientation the vacuum fluorescent display 413 (which in the preferred embodiment has the capability of displaying 14 characters of 7 segments each, although other types of displays with other combinations of characters and segments may be employed), and operational function lights "In Use" 511, "No Svc" 513, and "Roam" 515. Additional indicators are located on the cradle 501: a "Slide Card" light 517, a "Pls Wait" light 519, a "Lift Rcvr" light 521, and a "Sorry" light 523. The telephone lock switch 525 is also located on the cradle 501.

Figure 6:
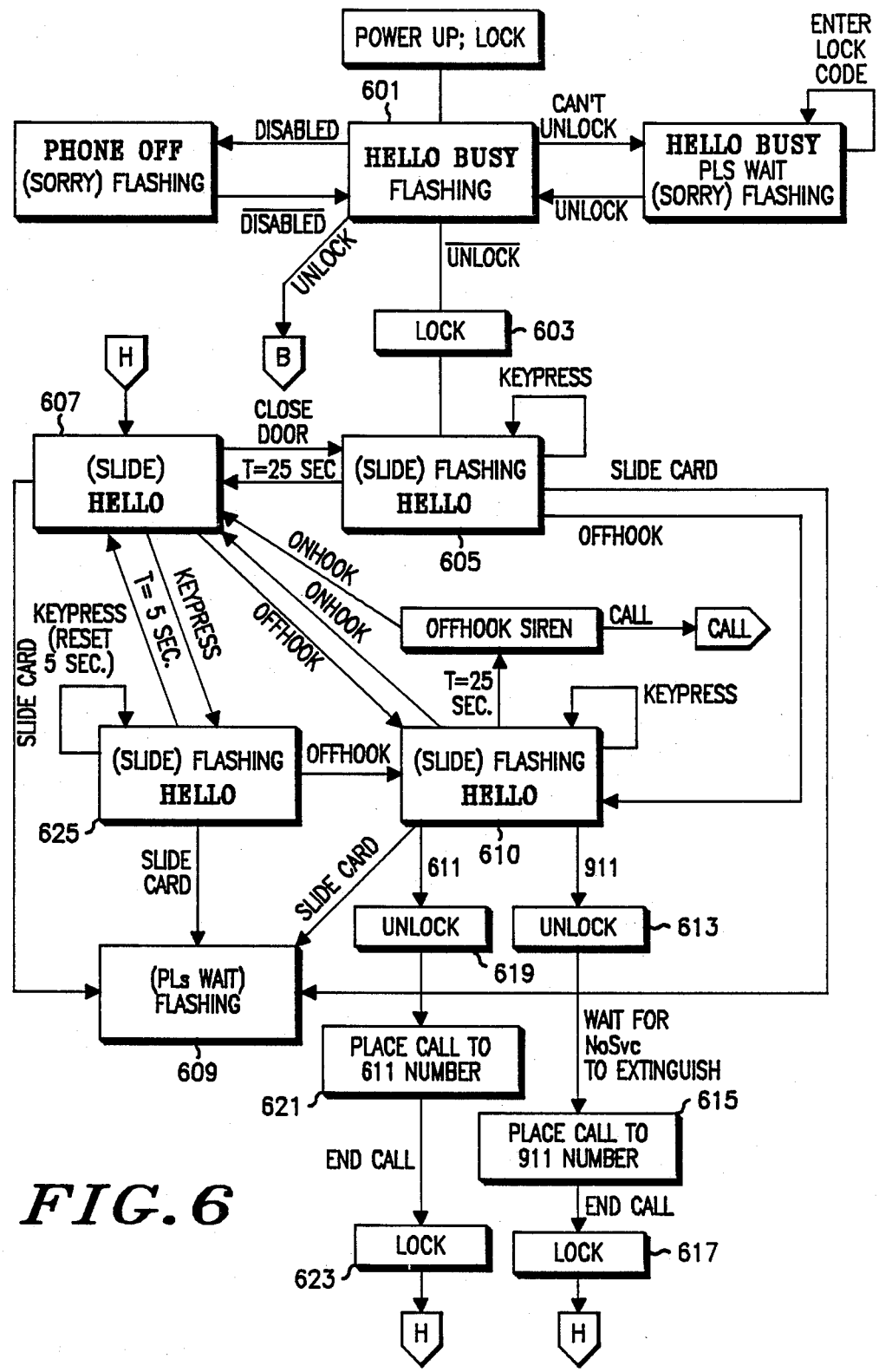
FIG. 6 is a state transition diagram which illustrates the states and state changes which form part of the present invention.

Referring now to a preferred embodiment shown in FIG. 6, which is a state transition diagram commonly used in complex system process flow (see "Introduction to Switching Theory and Logical Design", Fredrick J. Hill and Gerald R. Peterson, John Wiley & Sons, 2nd Edition, 1974-pages 241–306), when the control unit is turned on, a flashing "hello busy" as shown in state 601 is placed in the display 413. After approximately two seconds of information exchange with the mobile telephone transceiver 201, the control unit microprocessor 401 electronically locks the transceiver 201 via the logic unit 209 (as shown in state 603) and the process goes on to state 605. In this state the slide card light 517 is caused to flash and a steady "hello" is placed in the display 413. Twenty-five seconds later, the process goes to state 607. In this state the slide card light 517 is steadily illuminated as is the "hello" in display 413. If a card is slid through the card reader 435 by the user during this state, the "pls wait" flashing state 609 is entered. State 609 is further described in conjunction with FIG. 7.

Figure 7:
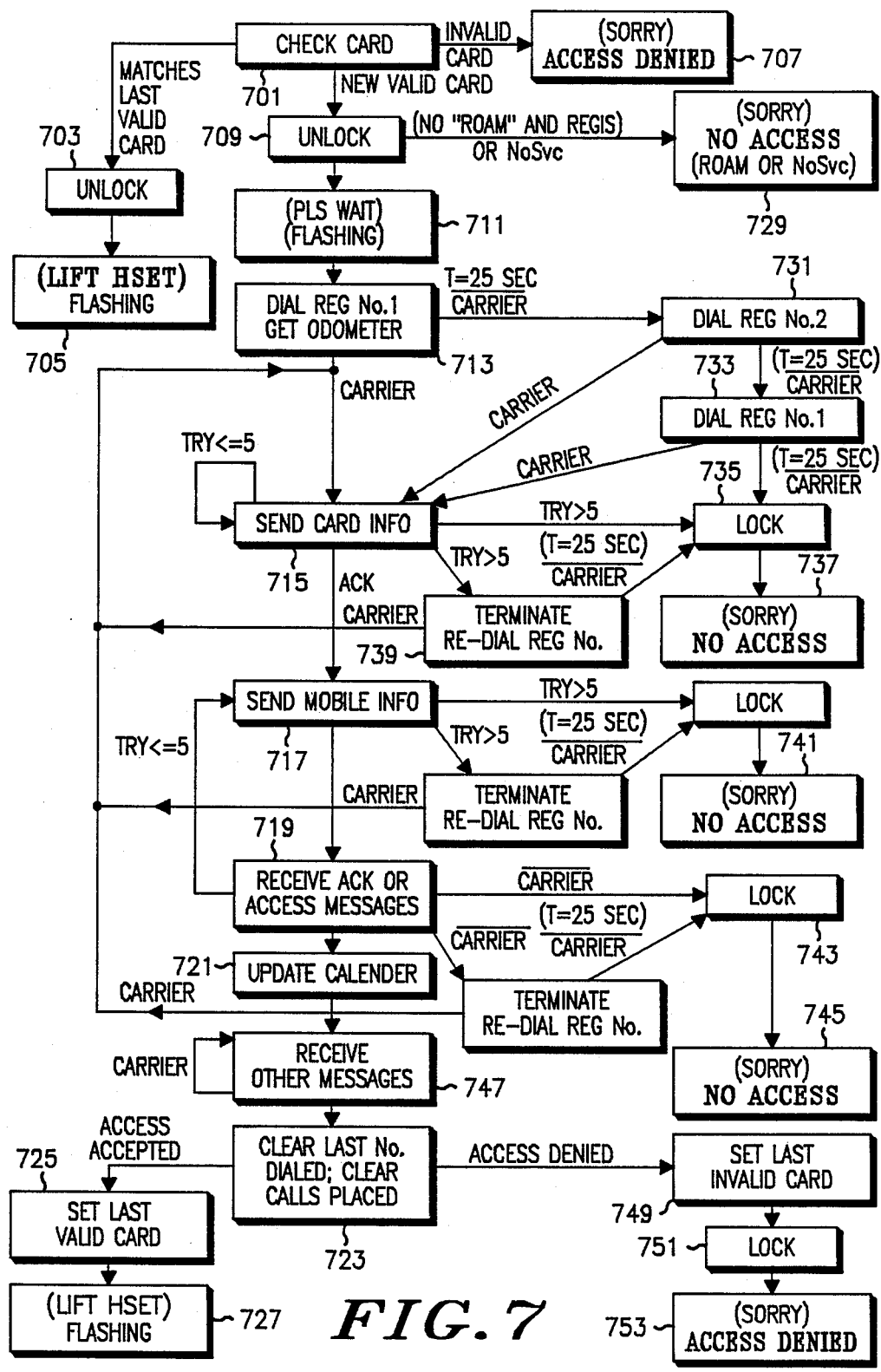
FIG. 7 is a state transition diagram which illustrates the states and state changes which may occur when a credit card is slid through a card reader in accordance with the present invention.

In FIG. 7 the card is checked (701) against two locations in memory EEPROM internal to microprocessor 401. The first location is designated "last valid card" which is the last card to have been registered from this unit. If the contents of the "last valid card" match the identification of that card, the transceiver 201 is unlocked at 703 and the lift handset state 705 is entered. The second location against which the card is checked is designated the "last invalid card". The last invalid card is the last card to have attempted a registration via this mobile unit and for which the registration computer 107 at the billing exchange 109 denied telephone service access. Such a service denial would occur if, for example, a stolen card is slid through the card reader 435 and the identification matches the "stolen card" records at the registration computer 107. At this point the process proceeds to the "access denied" state 707. This "access denied" state prevents a registration call and access to the billing exchange is thereby denied. Such a feature reduces radio air time usage by eliminating needless checking by the registration computer 107 of cards already shown to be invalid.

If the card identification is in neither mobile unit memory location, the expiration date of the card is checked as part of the check card state 701. If the card has not yet expired, the process proceeds to unlock (at 709) the transceiver logic unit 209 and place a call to the registration computer 107. This leads to state 711, where the "Pls Wait" light 519 is flashed on the control unit 203.

The registration process is controlled by the cradle microprocessor 401 and its associated memory 403. In a preferred embodiment, three telephone numbers are stored for use in calling the registration computer 107 as part of the registration process. A first step in the process (at 713) is the dialing of registration number one. This is accomplished by causing the transceiver logic unit 209 to retrieve the telephone number from microprocessor 401 memory EEPROM. The transceiver 201 is then caused to transmit and receive in conventional fashion. Also, as part of step 713, the unit recalls the call timer "odometer" (which is the cumulative number of minutes of air time used by this transceiver since the transceiver was manufactured). This "odometer" information can be used by the registration computer to determine how many minutes of user-placed telephone calls have occurred since the last registration. When carrier is received back from the registration computer 107 the "card information" message is sent (at 715) to the registration computer 107. The "card information" message essentially is track two of the credit card magnetic stripe; addition description of the "card information" message is given below. When an acknowledge message is received from the registration computer 107, another message, which is referred to as the "mobile information" message, is transmitted by the mobile unit at 717 to the registration computer 107. The "mobile Information" message includes such data as the mobile telephone number, the unit ID, the revision ID, the call timer "odometer" and other similar information. In the preferred embodiment both the "card information" and the mobile information message may be repeated up to 5 times if the previous transmission is not acknowledged.

In response to the mobile information message the registration computer 107 would transmit an access message which would be received by the mobile transceiver at 719. The access message includes with it a "calendar" which is a numerical representation of month and year. In the preferred embodiment, March, 1987 would be sent as 8703. This calendar is used to update (at 721) the calendar in the transceiver control unit 203. The calendar in the control unit 203 is used to check the credit card expiration date for assurance that the card validity has not expired.

At the conclusion of the access message, the registraitin computer hangs up and the entire mobile unit registration telephone call is terminated. A unique feature of the present invention is that which allows the user of the credit card mobile telephone to use the telephone to make calls in a manner which is identical from one call to the next. Accordingly, the process of credit card registration and validation is separate from the process of placing a telephone call. The mobile transceiver 201, in response to the access message, clears two memory locations at 723. Resident in the first memory location is the last phone number dialed by a user and resident in the second memory location is the number of calls placed by the last user. In addition an answer call flag and a roaming call flag are cleared.

Following the "access accepted" path, the process places the credit card identification in the last valid card memory location. This allows the unit to validate this last used card when the user slides this card through card reader 435 without making a registration call to the registration computer 107 even though the transceiver logic unit 209 were returned to the locked state. After the last valid card memory location is set at 725, the "lift handset" state 727 is entered. The user can place a phone call at this point.

Returning to the unlock block 709, if the mobile transceiver 201 is roaming but is not permitted to make registration calls while it is roaming, the process proceeds to the "sorry no access" state 729 and it would light the roam light 515. (Roaming is the operation of a mobile radiotelephone in a radio service coverage area different from that in which the radiotelephone is originally registered. For example, operation in another city served by a different radiotelephone service). Similarly, if service is not available at all, the system would end up in state 729. In effect state 729 tells the user to try again later.

The next possible variation, proceeds through the "pls wait" state 711 and into the "dial registration number one" activity 731. If 25 seconds pass and the registration computer 107 data carrier has not been detected, the call is terminated and the "dial registration number two" activity 731 is entered. If data carrier is detected, the process continues to "send card information" (at 715). However, if data carrier is not detected, after another 25 seconds, the call is terminated and "dial registration number 1" is dialed at 733. Similarly, if data carrier is found at this point, the process returns to "send card information" at 715. If data carrier is not detected after 25 seconds, the transceiver logic unit 209 is relocked at 735 and the "sorry, no access" state 737 is entered. (The dialing sequence just described is a standard registration call dialing sequence. Other sequences may be employed for different circumstances. For example, if the unit is roaming and roam dialing sequence is enabled, then the registration call dialing sequence could be another sequence of telephone numbers).

Returning to the "send card information" activity at 715, if after 5 times, the message cannot be sent or if data carrier is lost while the information is being sent, the call is terminated and the same registration is redialed (at 739). If data carrier is detected, the "send card information" block 715 is entered again. If data carrier is not detected after 25 seconds, the transceiver logic unit 209 is locked (at 735) and the process goes to the "no access" state 737. A similar process is employed to transmit the "mobile information" message (at 717). The process tries 5 times; if data carrier is lost and a registration number has been dialed more than twice with loss of data carrier, the process will end in the "no access" state 741.

After sending the "mobile information" message (at 717), the process expects one of three possible responses from the registration computer 107: an "access accept" message, a "deny access" message, or an "acknowledge" message. If the acknowledge message is received, the unit will wait as long as data carrier is detected for a subsequent accept or deny message. The acknowledge message (ACK) would be experienced if the registration computer 107 recognizes that it will take longer than 3 seconds to look up information in, for example, the stolen card files. In essence, more than two registrations calls results in a locking of the mobile transceiver (at 743) and an entry into the "no access" state at 745.

Upon transmitting an "access accept" message or a "deny access" message the registration computer 107 can send other messages which, in the preferred embodiment, might include messages such as a request for mobile radiotelephone status information, a reprogramming of mobile radiotelephone status, or a change in the contents of a repertory telephone number location. Message block 747 provides the opportunity to do so. If a "deny access" message is received, the card number ID that was read from the card is stored (at 749) in the "last invalid card" memory. The mobile unit is subsequently locked (at 751) and the "access denied" state 753 is entered. If the same card is wiped again, the process immediately goes to the "access denied" state 707 without placing another registration phone call.

Referring back to FIG. 6, after the mobile unit power is turned on, the process enters and leaves the "hello-busy" state 601, locks at 603, and stops in the slide card flashing "hello" state 605. If the credit card is wiped in state 605, the process will go directly to the "pls wait" flashing state 609 as described in FIG. 7. Other possibilities of action include the pressing of a key on dialing pad 409 which results in a flashing slide card light 517. This indication is basically to instruct the user to slide a credit card at this time.

If the unit is in state 607 and a detection of the vehicle door being opened and closed occurs, the process goes to state 605 and the "slide card" light 517 is flashed for 25 seconds. This is a welcome message to a new user of the system. From state 607, if the handset 407 is taken off hook, the process goes to state 610 which has a flashing "slide card" light 517 and a "hello" in the display 413. Pressing any key on keypad 409 will hold the process in this state. If the handset 407 is placed on hook, the process will return to state 607.

Another exit from state 610 (where the handset is off hook) may be the dialing of 911. If 911 dialing is enabled and 911 is entered on the keypad 409, the mobile unit will unlock (at 613), when the "no svc" light 513 is extinguished. A call is placed to the 911 emergency number (at 615). When the emergency call is ended, the unit will lock (at 617) and return to state 607. Similarly, if 611 dialing is enabled and 611 is entered on the keypad 409, the unit will unlock (at 619) a call is placed to the number which is stored in microprocessor 401 internal memory EEPROM referred to as the 611 number (at 621). At the conclusion of this call, the unit is locked (at 623) and the process returns to state 607.

If keypad keys are pressed while the process is in state 607, the process goes to state 625 where the "slide card"

light 517 is flashed and "hello" is placed in the display 413. After the user stops pressing keys and 5 seconds transpires, the process returns to state 607. Also, the handset 407 is taken off hook while the process is in state 607, the process proceeds to state 610. If a credit card is subsequently slid, the process goes to the "pls wait" light 519 flashing state 609.

Figure 8A:
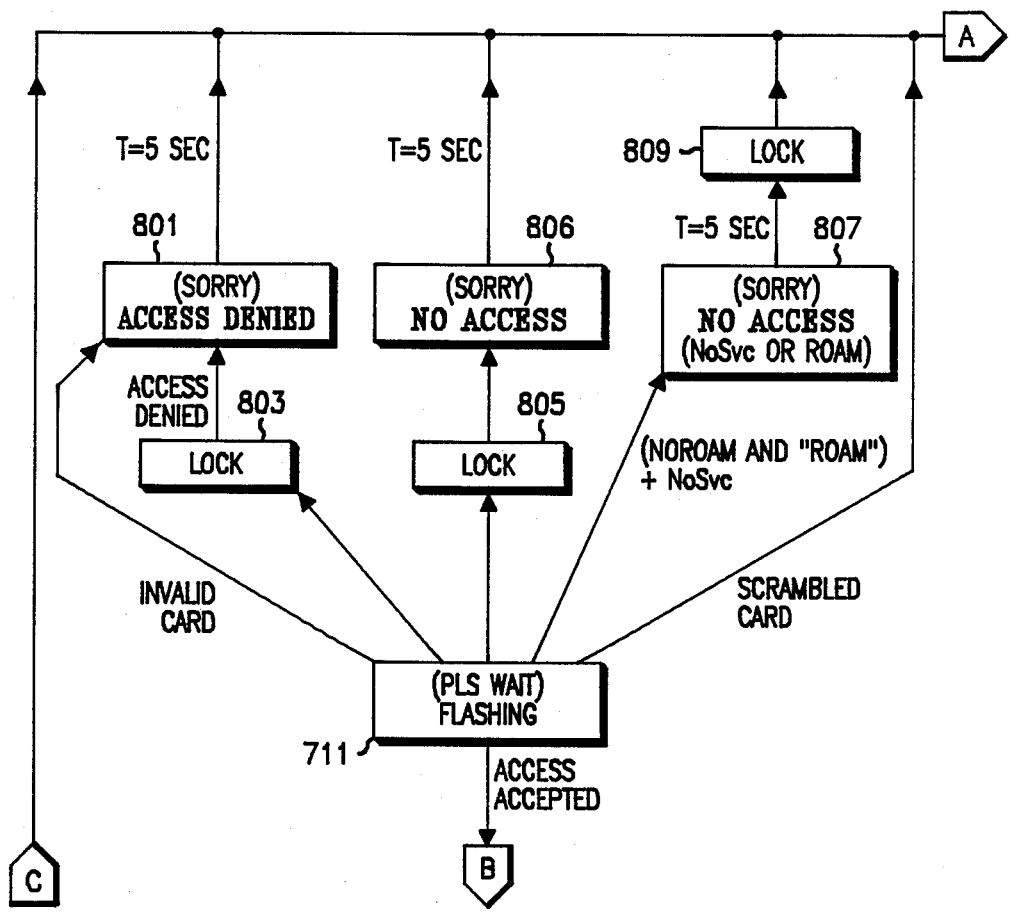
FIGS. 8A, 8B, and 8C are a state transition diagram which illustrate the "Pls Wait" state of FIG. 6.

Turning now to FIG. 8A and starting at state 711 where the "pls wait" light 519 is flashing, several paths exit the state. The first path is followed if the card track two was not read properly; the system returns to state 607. The second path is followed if the card data matches the last invalid card. The process goes to the "sorry access denied" state 801 for 5 seconds and then returns to state 607. Similar steps are followed if the card validity date has passed. If the registration computer 107 tells the system that access is denied on the card, the mobile logic unit 209 is locked (at 803), the "access denied" state 801 is entered for 5 seconds, and the process returns to state 607 after the 5 seconds. If sufficient data errors are experienced with the connection to the registration computer 107 and the call is never successfully completed, the mobile logic unit 209 is locked (at 805), "no access" is entered in the display 413 and the "sorry" light 523 is illuminated (state 806) for 5 seconds before returning to state 607. If the unit is roaming and roam is not permitted or if there is no service available, the control unit 203 would be placed in state 807 ("no access" in display 413, illuminated "sorry" light 523 and an illumination of either the "no svc" light 513 or the "roam" light 515) to indicate the reason of failure to the user. Five seconds later the process locks the logic unit 209 (at 809) and returns to state 607.

Figure 8B:
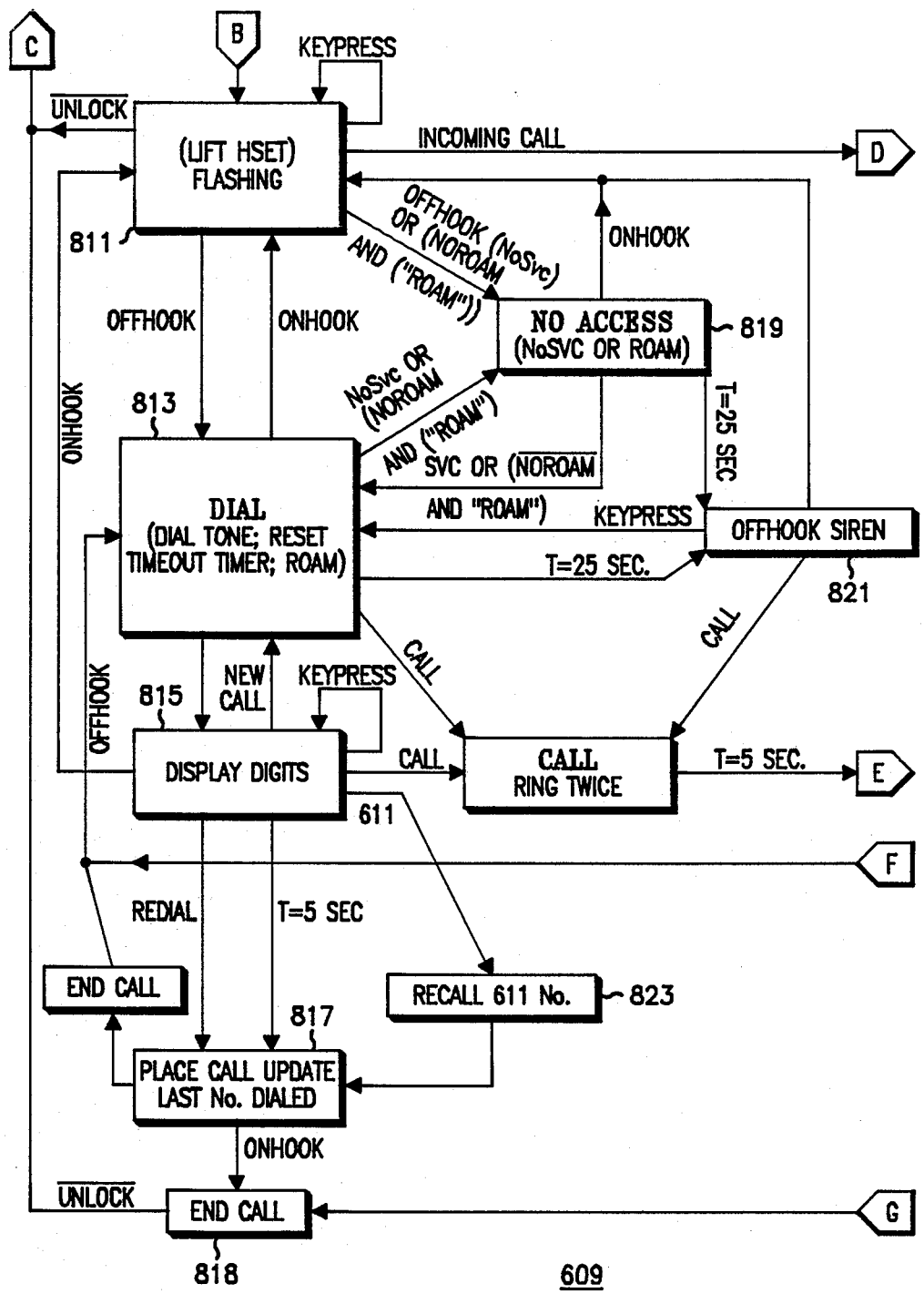

Assuming the card is passed by the registration computer 107 and the process progresses from the "pls wait" state 711, the access accepted path leads to state 811, the "lift hset" state shown in FIG. 8B. In this state, the "lift rcvr" light 521 flashes and a time-out timer circuit in the control unit 203 is reset. If no service exists in the geographic area where the mobile transceiver is located or if the mobile transceiver is roaming, the appropriate light is lit on the handset 407.

Normally, service is available and the transceiver is not roaming. If the user takes the handset 407 off hook, the process goes to state 813 where "dial" would be placed in the display 413, dial tone will be generated by the control unit 203, and the process waits for the user to dial digits on the keypad 409. At this point, if the user dials a telephone number, the digits will be echoed to the display 413, (at 815) and the dial tone is turned off with the first depressed key. Upon completion of dialing and termination of a 5 second waiting period, the call is placed to the dialed umber (at 817). The control unit 209 last number dialed (part of microprocessor 401 EEPROM) is updated to this phone number. When the user ends this call, the process either returns to the "dial" state 813 if the handset 407 is off hook or returns to the "lift hset" state 811 if the handset 407 is on hook. If the call is terminated by placing the handset 407 on hook, the mobile transceiver logic unit 209 is placed in a locked state at 818 and the system goes to state 607. In the preferred embodiment there are four programmable lock triggers and one non-programmable lock trigger in which the mobile transceiver logic unit 209 is placed in an electronically locked condition which can be unlocked by an access command from the registration computer. The four triggers are: (1) a time out lock trigger with a preprogrammed time out period, programmed in minutes from 1 through 255; (2) a lock trigger which activates each time the handset 407 is placed on hook; (3) a vehicle door open detector which triggers the lock any time the door is opened; and (4) a power-up lock which causes the mobile transceiver to be in the lock state when power is applied to the transceiver. The non-programmable lock trigger is activated from the "lock" switch 525 on the control unit cradle.

Returning to the "lift hset" state 811, if there is no service or if the mobile transceiver is roaming when roam is not permitted, state 819 places "no access" in the display 413 accompanied by illumination of either the "no svc" light 513 or "roam" light 515. Dial tone, however, is not activated in state 819 as an indication that calls cannot be placed. If the handset 407 is placed back on hook, the process will return to state 811, "lift hset". If the service becomes available or if roaming is permitted, the process will immediately go to the "dial" state 813 while the handset 407 is still off hook. The user can then place a call. If from either the "dial" state 813 or the "no access" state 819 no further actions are taken by the user for 25 seconds, the off hook siren is activated (at 821) as an indication that the unit is not correctly on hook. Pressing a key at this state returns the process to state 813 where digits are echoed to the display 413. From this "dial" state 813, if the user presses * button, the "dial" in the display 413 would momentarily blank and the dial tone would momentarily vanish, to give an indication to the user that he has just cleared the control unit states. If he had dialed some digits prior to pressing the button, the digits will be erased and dial tone would return. Pressing a redial key will cause the control unit 203 to redial the number stored in repertory memory location 00 of the mobile telephone, the last telephone number to be dialed. The call will be placed immediately rather than waiting for 5 seconds. Another exit from state 813 is that of dialing 611 (to obtain repair and information intercept operator). Upon detecting 611 (at 823), a call will be placed to the telephone number which is stored in the microprocessor 401 memory EEPROM location corresponding to the 611 dialed number. At the conclusion of the 611 call, the process goes back to the "lift handset" state 811 if the handset 407 is on hook.

Figure 8C:
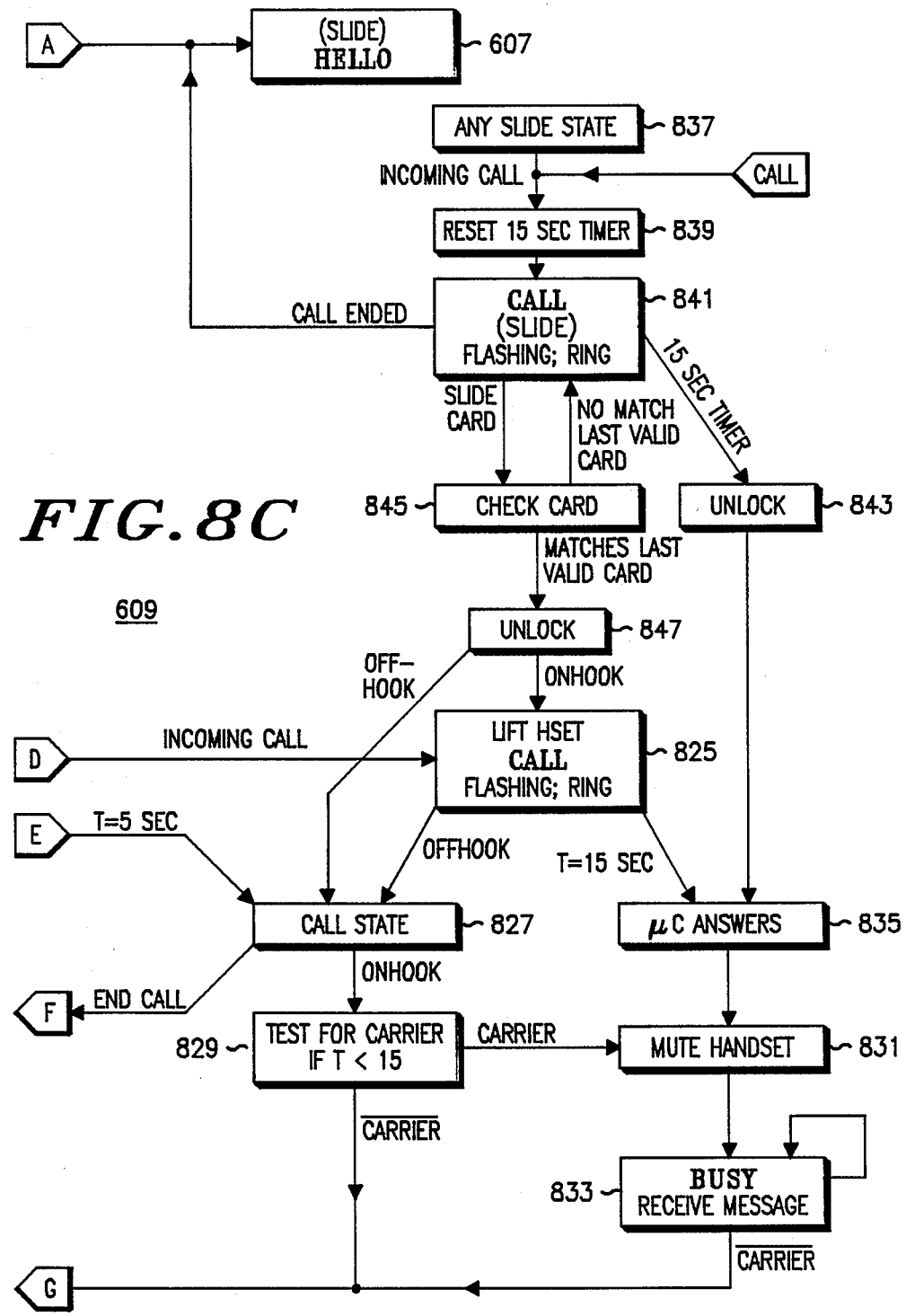

Incoming calls are handled in several ways. If the process is at the "lift hset" state 811, and a call is received, the process goes to state 825 "lift hset" as shown in FIG. 8C. The word "call" is placed into the display 413, the "lift rcvr" light 521 will remain flashing, and an audible ring will be generated. If the user goes off hook, the process moves to the "call" state 827, where it remains for the duration of the telephone call. When the user goes back on hook after 15 seconds, the process returns to the "lift hset" state 811 by passing through the "dial" state 813. If the user hangs up in less than 15 seconds, the control unit 203 will test for received data carrier at 829. If such carrier is not detected within 5 seconds, the process returns to the "lift hset" state 811. However, if data carrier is detected, the handset audio will be muted at 831 and the process proceeds to state 833. In state 833, "busy" is placed in the display 413 and any messages coming from the registration computer 107 will be received by the cradle microprocessor 401 via modem 433. Any appropriate return messages will be sent back to the registration computer 107 at this time. At the conclusion of this type of call, the process returns to state 607 with the phone "locked".

Returning to state 825 in FIG. 8C, if the user does not answer the called phone within 15 seconds, the process goes to state 835. The cradle microprocessor 401 will answer the call, mute the handset at 831, and go to the "busy" state 833. Again, at the conclusion of this call, the process returns to state 607 with the phone locked. It is assumed at this point communications will take place between the cradle microprocessor 407 and the registration computer.

The process may await an incoming call in any of the slide card states of FIG. 6 in the "any slide state" block 837 of FIG. 8C. If a call comes in, a 15 second timer will be reset at 839 and state 841 is entered. In this state, the "slide card" light 517 will continue to flash and "call" will be placed in the display 413. If the call ends before anything else takes place, the process returns to state 607. However, if the 15 second timer times out, the mobile transceiver logic unit 209 will be unlocked and state 835 enables the cradle microprocessor 401 to answer the call. Alternatively, the user can slide a credit card through the card reader 435 and the card is checked at 845. If the card ID matches the last valid card, the process unlocks the mobile transceiver logic unit 209 (at 847) and goes to state 825, if the handset 407 is on hook. If the handset 407 is off hook, the process enters state 827, the call state.

Figure 9:
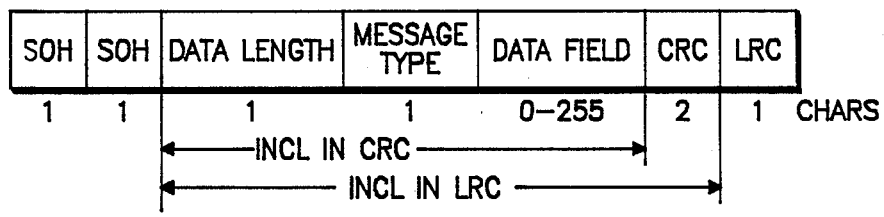
FIG. 9 is a diagram showing the composition of a data message employed in the present invention.

Referring now to FIG. 9, a message format employed in the preferred embodiment is illustrated in block form. It is important that the information encoded on the credit card be correctly transferred to the registration computer 107 for validation and billing. If the credit card information is received incorrectly, either the wrong person or no one is billed for the subsequent phone calls.

A variable length message format and signalling scheme transmitted in asynchronous format using one or more bytes having a start bit, eight data bits, and one stop bit is employed in the preferred embodiment. The variable length message format improves the probability of successfully receiving messages in a fading environment because the message is only as long as it needs to be rather than an arbitrarily selected fixed length. The message includes two forms of error checking - a cyclic redundancy check (CRC) and a longitudinal redundancy check (LRC). The combination of the CRC and the LRC should yield a delivered bit error rate (BER) better than $10^{-7}$.

As shown in FIG. 9, the opening flag consists of two start-of-header SOH characters (ASCII $01 in the preferred embodiment). The length of the data field is identified by "data length" consisting of a one byte character. The message type, which is identified by a unique number from 0 to 255, is identified by the next character byte in the format. The variable length data field follows and consists of from 0 to 255 bytes of information. The CRC is calculated over the "data length", "message type", and "data field" bits using a CRC-16 polynomial. In this format, a sixteen bit value is transmitted in two characters (CRChi/CRClo)with the most significant byte transmitted first. The CRC is conventionally calculated by dividing the data message bit pattern by the CRC-16 polynomial and saving the remainder as a sixteen bit value CRC. The LRC is an odd parity check calculated on columns over the "data length", "message type", "data field", and "CRC" fields. The LRC is generated by exclusive OR-ing each byte of the message with the last value of the LRC and the result is stored as the current value of LRC.

There are three basic message categories employed in the preferred embodiment: (1) typical mobile-to-base; (2) typical base-to-mobile; and (3) setup. All of the parameters required by the mobile unit for operation can be programmed by the registration computer 107 using setup messages. The messages employed in the preferred embodiment are summarized as follows:

| Message # | Data Length | Message Contents |
|---|---|---|
| | | MOBILE-TO-BASE |
| 1 | 20 | credit card track 2 |
| | | BASE-TO-MOBILE |
| 2 | 2 | access accepted, calendar |
| 3 | 2 | access denied, calendar |
| 4 | 0 | terminate |
| 5 | 1 | return 1 specified message |
| | | SETUP |
| 6 | 5 | registration phone #1 |
| 7 | 5 | registration phone #2 |
| 8 | 5 | registration phone #3 |
| 9 | 13 | credit card table |
| 10 | 10 | last invalid card used |
| 11 | 6 | repertory location, phone # |
| 12 | 1 | acknowledge message type |
| 13 | 0 | negative knowledge |
| 14 | 2 | lock options, time out time |
| 15 | 1 | roam options |
| 16 | 5 | 611 phone number |

The message number may be arbitrarily selected by the designer of the message communication system. Likewise the number of messages may be more or less depending upon the needs of the system.

Figure 10:
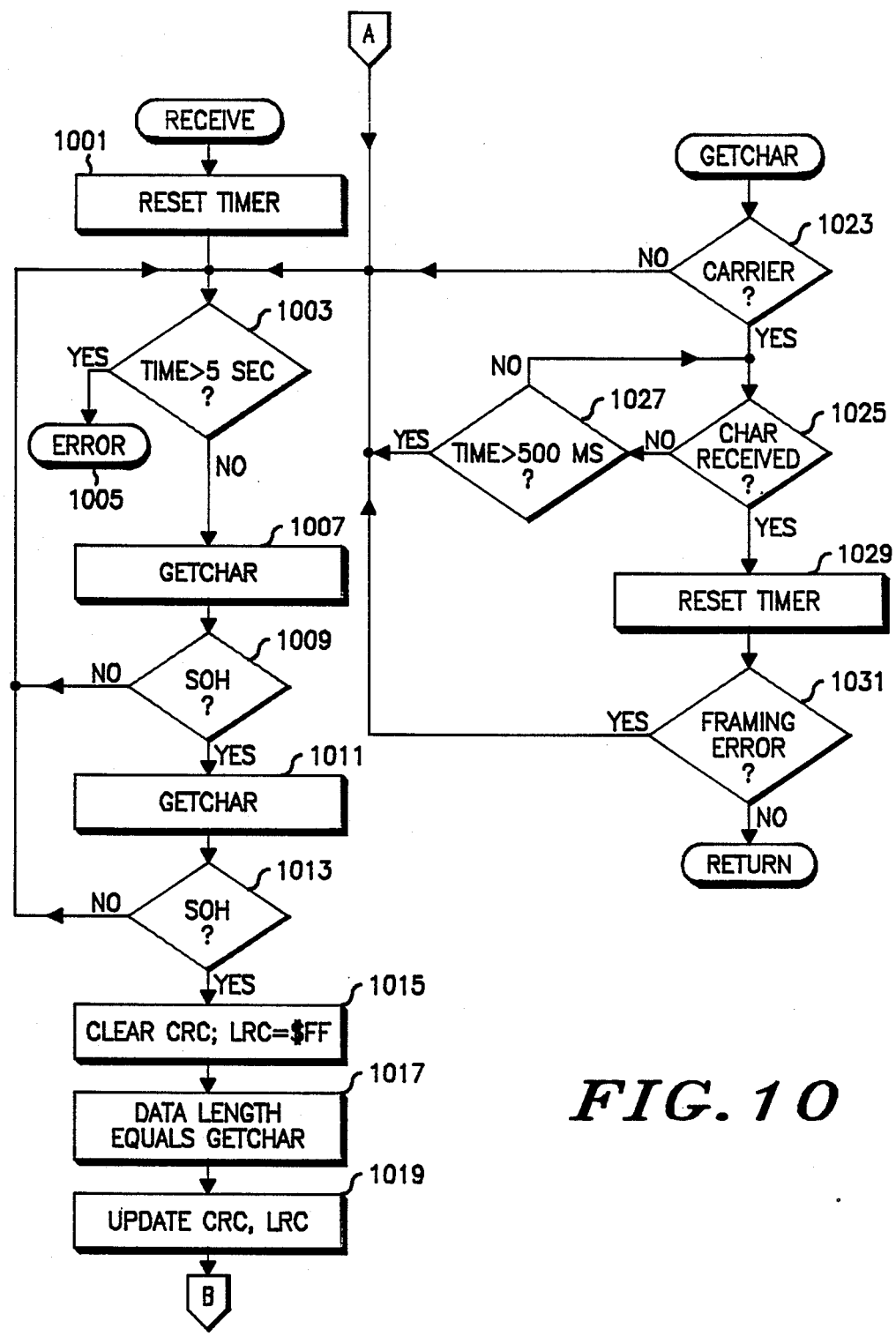
FIG. 10 is a flowchart showing the process employed in the present invention in recovering the data message in both the mobile unit and the registration computer.

Referring now to FIG. 10, the message protocol employed in the present invention is diagrammed in flowchart form. Generally, the message protocol calls for a retransmission of a message if it is not acknowledged within, for example, three seconds or if a negative acknowledge (NAK) is received. If the CRC or LRC check characters calculated by the process do not match that sent by the transmitter, the message will be NAK'ed. Five transmissions are attempted for each message. A properly received message may be acknowledged by an acknowledge message (ACK) or by other specific messages.

The mobile transceiver transmits the credit card information read from a user's credit card magnetic track, information identifying the mobile unit, and other miscellaneous information to the registration computer 107 as described above. The registration computer 107 updates the microprocessor clock in the control unit and, inter alia, allows or disallows the user to place calls. The registration computer 107 may also program the features of the control unit microprocessor system to provide remotely controlled features of the credit card system and program the repertory phone number list of the mobile transceiver logic unit 209. The control unit 203 needs to know such information as the telephone numbers of the registration computer, the prefixes of the credit card identification which should be accepted by the unit, and which lockout triggers should be enabled.

The flowchart of FIG. 10 starts at the "Receive" process subroutine in cradle microprocessor 401 in which the reception timer is reset at 1001. The "Receive" process is utilized at both the mobile unit 101 and the registration computer 107 to recover the data message with a minimum number of errors. A test is made at 1003 to determine if the timer has timed out (exceeded 5 seconds in the preferred embodiment) and if it has timed-out, an error is flagged at 1005. If the timer has not timed-out, the "Getchar" subroutine is entered at 1007. Upon return from the "Getchar" subroutine, a test is made at 1009 of the received character to determine if the character is the SOH ($01) character expected at the beginning of the message. An improper character returns the process to the timer test of 1003. A proper character leads to a second calling of subroutine "Getchar" at 1011 and a second test for the SOH character at 1013. A second correct character at the beginning of the message causes the process to clear the CRC memory and a preloading of $FF in the LRC memory (at 1015); an improper character returns the process to the timer test of 1003. The "Getchar" subroutine is again called and the length of the data field is established by the third byte of the message. The data length is set by the character returned by the "Getchar" subroutine (at 1017). The CRC and LRC memories are updated at 1019 before the process moves to the message bytes acquisition shown in FIG. 11.

The "Getchar" subroutine is also shown in FIG. 10. A test of received carrier is first made at decision block 1023. Lack of data carrier returns the process to the timer test block 1003; carrier detection results in a test of whether a character is received within 500 milliseconds (at 1025 and 1027). The received character is returned to the calling subroutine. The timer is reset at 1029 before a test for a framing error is made at 1031. A framing error consists of a missed stop bit where such a miss causes the process to return to the timer test of block 1003 and no framing error causes the process to return to the "Getchar" subroutine calling point in the process.

Figure 11:
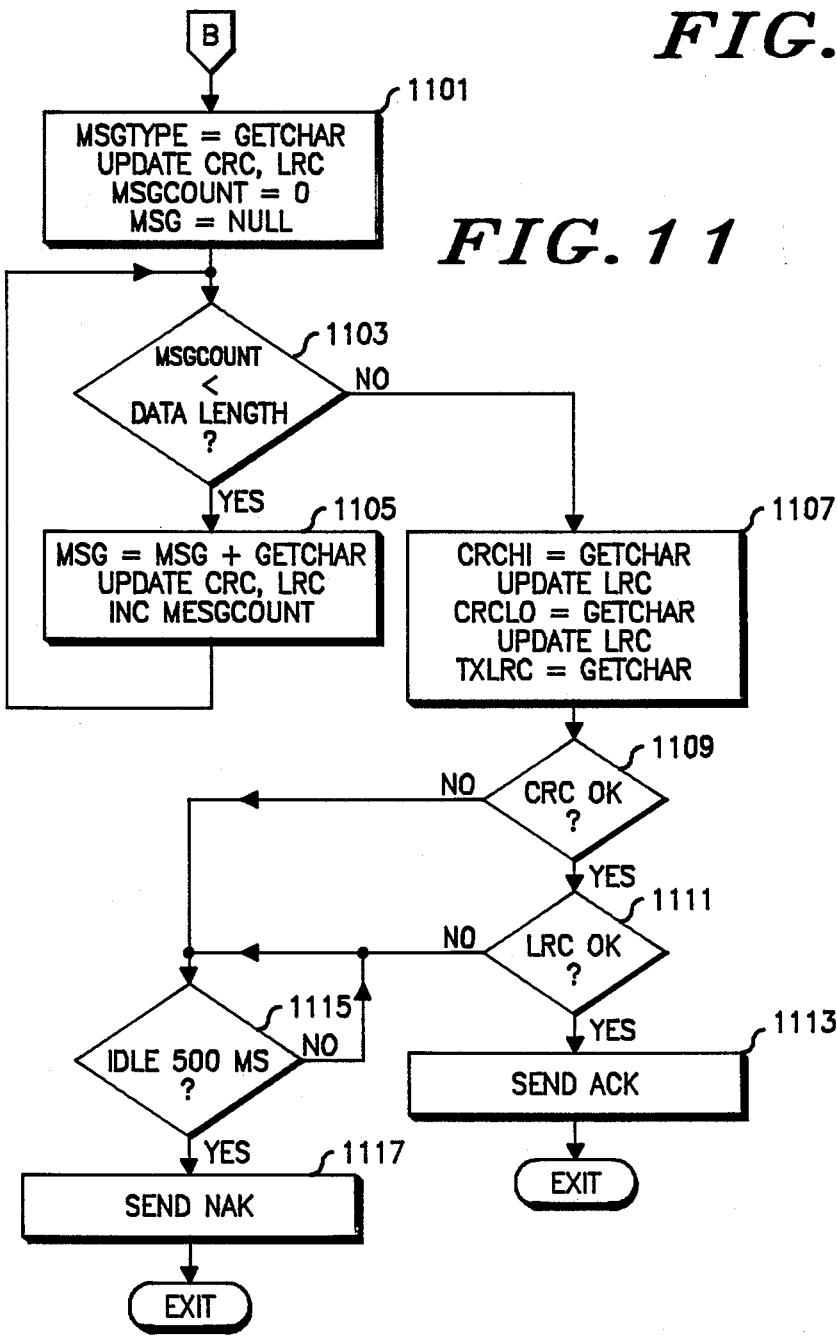
FIG. 11 is a flowchart of the Getchar subroutine utilized by the process of FIG. 10.

The message type character is obtained by calling the "Getchar" subroutine from block 1101 of FIG. 11. Other initializations of the premessage state are made in block 1101. So long as the message counter is less than the established data length, the message counter test of decision block 1103 allows the message storage location to fill with the message character by character with repeated calls of the "Getchar" subroutine and the calculation of CRC and LRC to proceed with each message character (at 1105). When the message count and the data length are equal, the two CRC characters are obtained from successive calls of the "Getchar" subroutine and the LRC character is obtained from a third call of the "Getchar" subroutine (at 1107). The CRC characters are then checked for correlation to the CRC calculated during reception of the data length, data type, and data message bytes at decision block 1109. A positive result causes the process to test the LRC character against the calculated value at 1111. A positive result causes an ACK to be transmitted (at 1113) before the process returns to other tasks. If either the CRC check or the LRC check are not positive, a test is made at 1115 for an idle condition: no received characters during the idle period. Thus, if no characters are received for 500 milliseconds, a NAK is transmitted at 1117 and the process returns to other tasks.

Figure 12A:
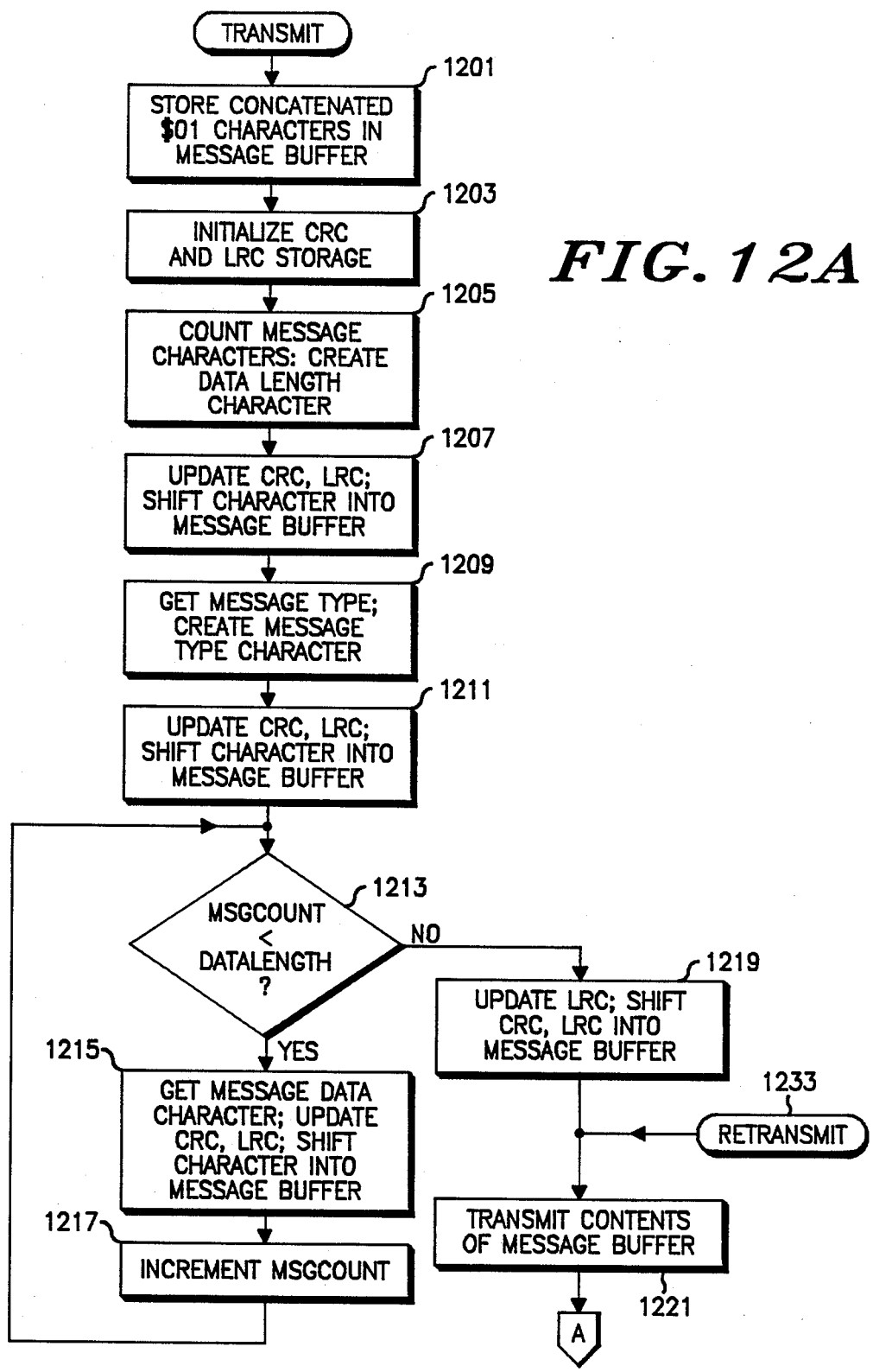
FIGS. 12A and 12B are flowcharts of the message transmission process employed in the present invention.
Figure 12B:
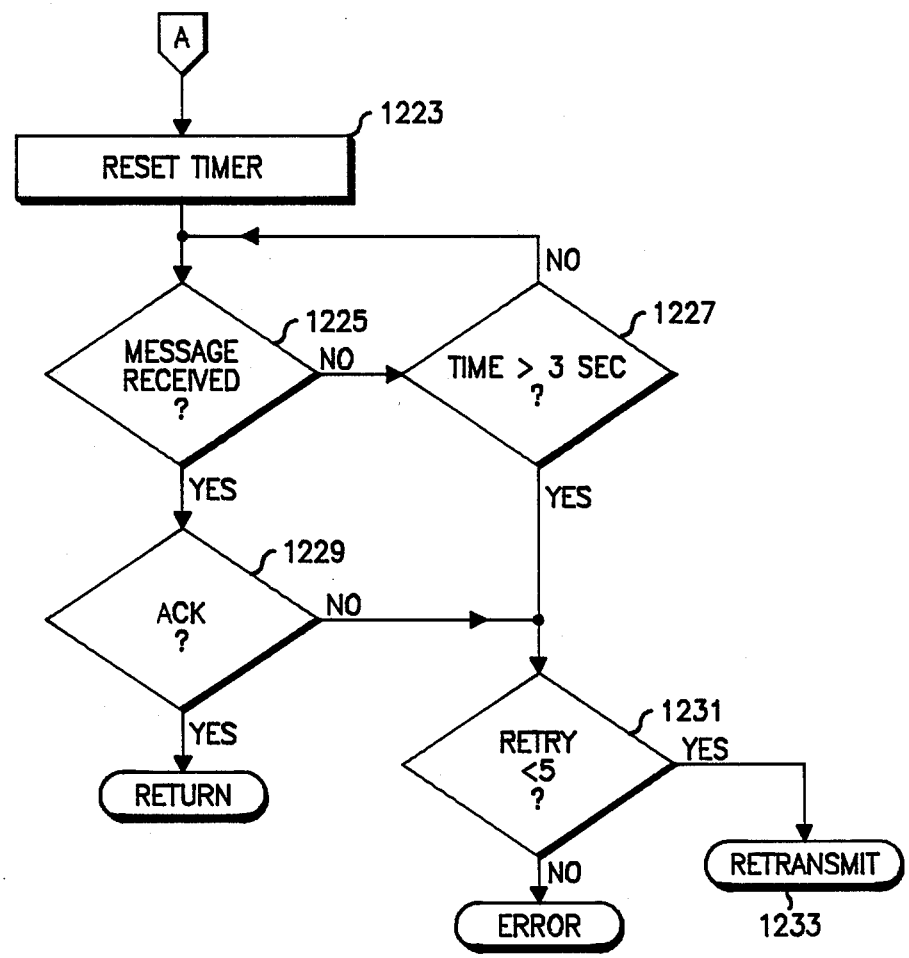

The process of message transmission is shown in the flowchart of FIG. 12. The process shown may be employed by both the mobile unit 101 and the combination of fixed site equipment 103 and registration computer 107. The mobile unit 101 typically generates credit card track messages while the registration computer typically generates control messages (as described previously). Thus, the data for the mobile unit 102 message are input from the reading of track two of the credit card when the user wipes the card through the card reader 435 of the control unit 203. Likewise, the data for the base message is input from the internal functions of the registration computer 107.

The data transmission process, "Transmit" commences with the storage of two concatenated start-of-header (SOH) characters ($01) in the message buffer of the process (at 1201). The CRC and LRC storage locations are initialized at 1203. In order to generate the "Data length" field character, the message characters are counted and the data length character is created (at 1205). The cyclic redundancy code (CRC) character storage and the longitudinal redundancy check (LRC) character storage is updated with the data length character and the data length character is shifted into the message buffer (at 1207). The message type field character is created (at 1209). The CRC and LRC character storage is updated and the message type character is shifted into the message buffer (at 1211).

The data message itself is shifted into the message buffer one character at a time, thereby enabling the updating of the CRC and LRC characters on each message character. This message shifting is shown in the loop of 1213, 1215, and 1217. When the message length counter (MSGCOUNT) equals the data length character (DATALENGTH) the loop is exited (at 1213) and the CRC and LRC characters are shifted into the message buffer following the update of the LRC character from the CRC characters (at 1219). The contents of the message buffer are then transmitted by the radio transmitter (at 1221) and the 3 second timer is reset at 1223.

The "Transmit" subroutine then looks for an message transmitted back from the mobile transceiver at decision block 1225 while waiting for the 3-second timer to time out at 1227. If the message contains an ACK (or is itself an acknowledgment), as determined at decision block 1229, the process returns to other tasks. If an ACK is not received in a message from the mobile or if the timer times out without receiving a message from the mobile transceiver within three seconds, a test of the number of retransmissions is made at block 1231. If the number of retries is less than five, the "Transmit" subroutine is called again, at 1233. If three retries have been attempted without acknowledgment, an error is flagged and the process returns to other tasks. The process may then hang up and try again.

Figure 13:
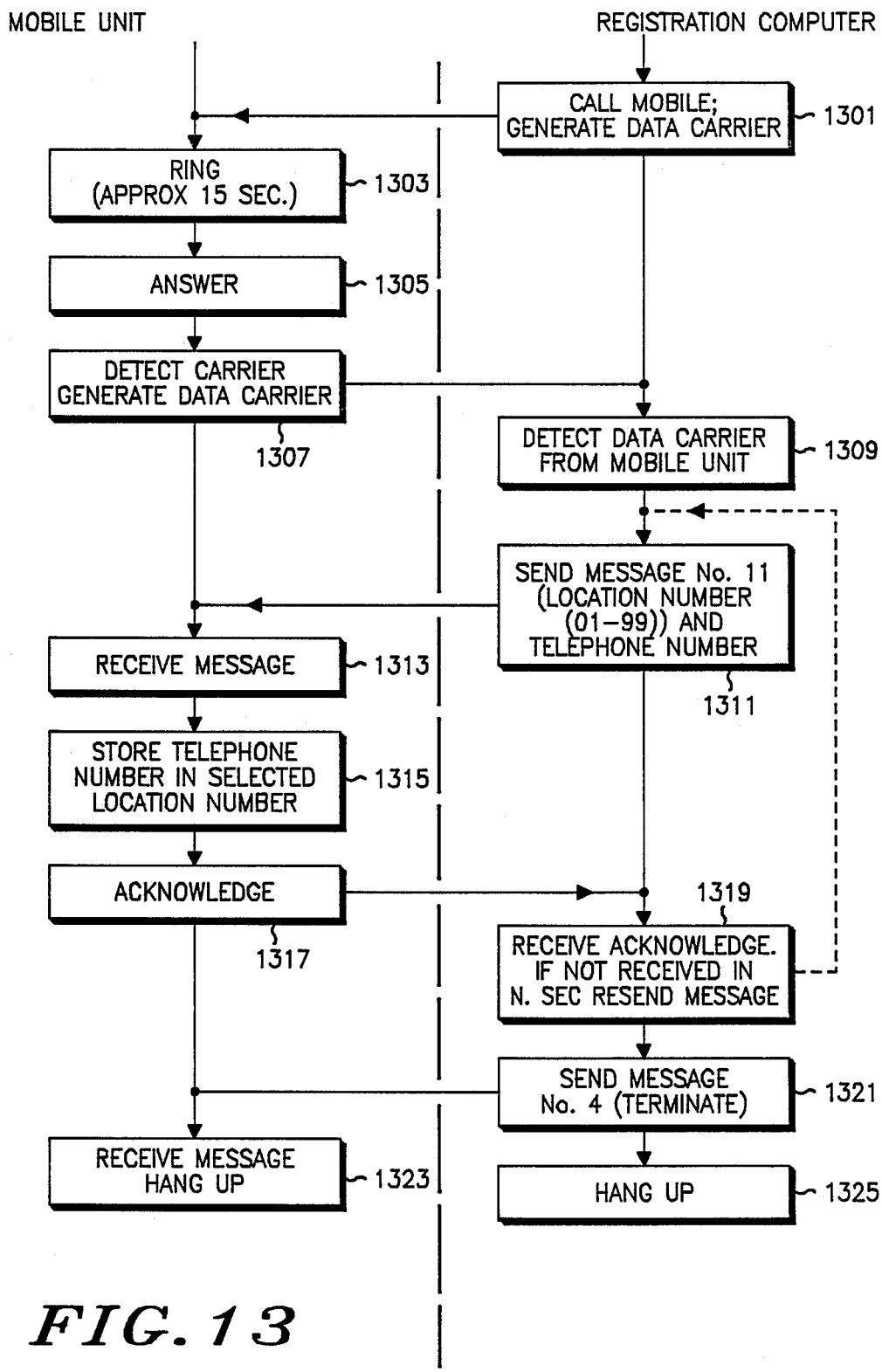
FIG. 13 is a flowchart of the remote programming of telephone numbers employed in the present invention.

The system of the present invention has the unique capability of accepting telephone numbers and other programming information at the mobile unit for storage in the logic unit microprocessor 301 and the cradle microprocessor 401 when transmitted from the base. Further, the programmed information may be recalled from the mobile unit memory and repeated to the base. An example of this remote programming of telephone numbers is shown in FIG. 13. The process is initiated at the registration computer 107 where the mobile unit is called (over one of the telephone trunks linking the registration computer 107 to the radiotelephone system) and data carrier is generated, at 1301. Once the telephone connection is complete and the mobile unit is rung (at 1303) and answers (at 1305), the cradle microprocessor 401 detects the data carrier and generates data carrier (at 1307) via modem 433. This mobile unit generated data carrier is transmitted via the mobile telephone call to the registration computer where it is detected (at 1309). In the example of FIG. 13, the registration computer 107 generates a data message #11 (as defined previously). Message #11 includes the digits of a telephone number to be stored in the memory of the mobile unit and the location number at which the telephone number is to be stored (at 1311). The message of block 1311 is transmitted to the mobile unit where the message is received (at 1313), the telephone number is stored in the designated memory location (at 1315), and the message is acknowledged (at 1317) in a manner described previously. The acknowledgment is received at the registration computer (at 1319) and the registration computer 107 sends (at 1321) a termination message, (#4) to the mobile unit. Upon receipt of the termination message, the mobile unit hangs up (at 1323). The registration computer hangs up (at 1325) after the transmission of message #4. If an acknowledgment of message reception is not received (at block 1319) by the registration computer 107 in a predetermined amount of time selected by the system operator, the process of sending message #11 is repeated.

Figure 14:
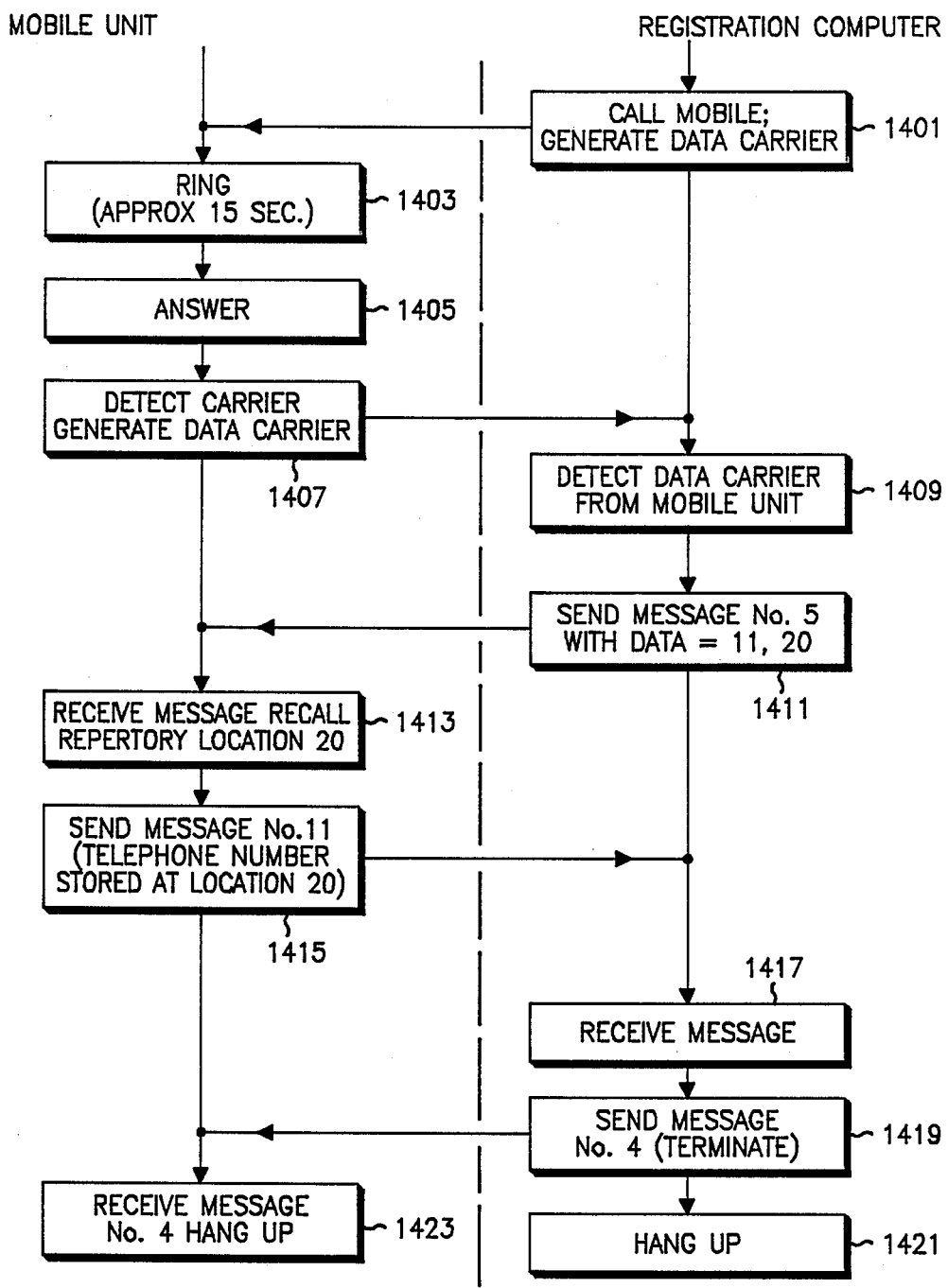
FIG. 14 is a flowchart of the repertory telephone number file recall process employed in the present invention.

The registration computer 107 may request the contents of a selected telephone number memory location to be read with the use of message #5. This process is shown in FIG. 14. The mobile unit is called (at 1401) by the registration computer, rings (at 1403), answers (at 1405), detects data carrier and generates data carrier (at 1407), and transmits the data carrier to the registration computer. The registration computer 107 detects carrier from the mobile unit(at 1409) and progresses to sending the message #5 including the data message at 11,20 (at 1411), which causes he repertory memory location 20 to be read upon receipt of the message by the mobile unit (at 1413). The mobile unit then responds with a transmission of message #11 including the digits of the telephone number stored at repertory location 20 (at 1415). The registration computer receives the message (at 1417), transmits a termination message #4 (at 1419), and hangs up the call (at 1421). The mobile unit receives the termination message and hangs up (at 1423).

Figure 15A:
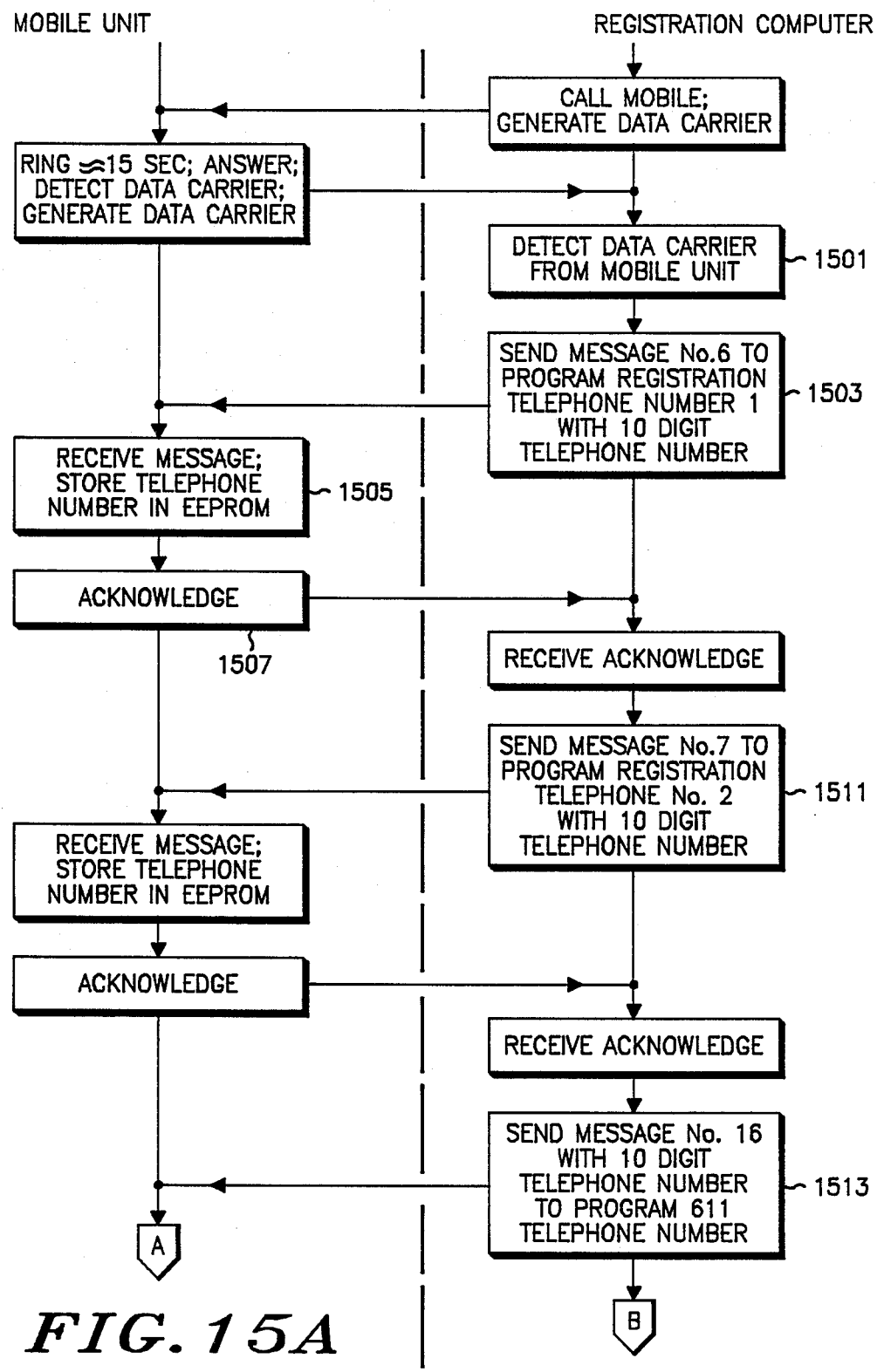
FIGS. 15A and 15B are flowcharts of the remote programming of registration telephone numbers employed in the present invention.
Figure 15B:
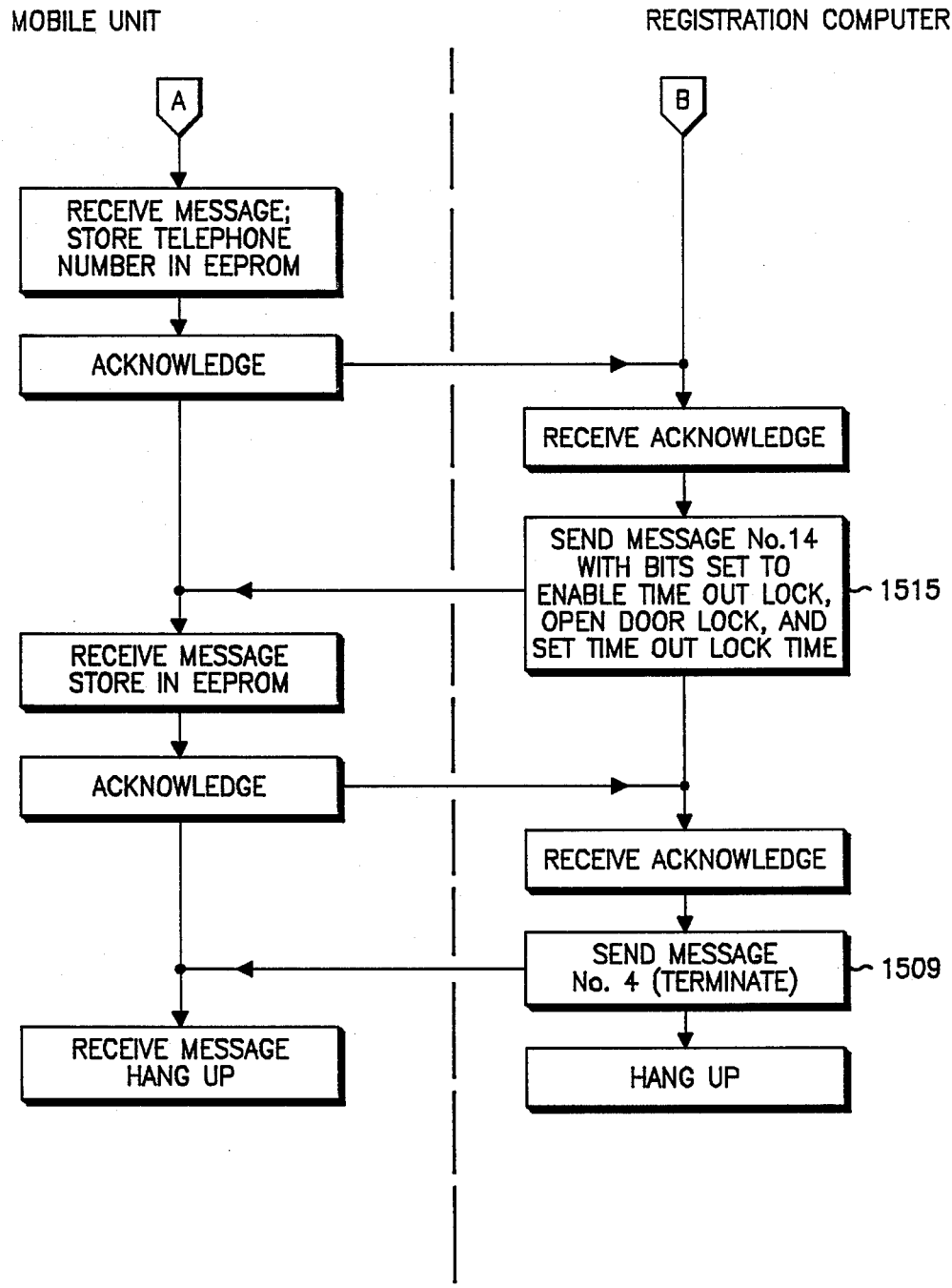

The registration computer 107 may also load other parameters into the memory of the mobile unit such as shown in the example of FIG. 15. The registration computer places a call to the mobile unit and generates data carrier, and in response the mobile unit answers the ringing and generates data carrier as described previously. The registration computer 107 detects mobile generated data carrier (at 1501) and sends, for example, message #6 (registration telephone number 1) with the digits of the telephone number used as registration telephone number 1 when registering with the registration computer (at 1503). The receipt of this message at the mobile unit causes the mobile unit to store the digits of the telephone number in the microprocessor 401 EEPROM storage location reserved for registration telephone number 1 (at 1505). The mobile unit then acknowledges the receipt of the message (at 1507). The registration computer, after receipt of the acknowledgment, may proceed in sending other information for programming the microprocessor 401 EEPROM or it may terminate the call (at 1509) as previously described. The other messages shown in FIGS. 15A and 15B are the telephone number to be stored in the mobile unit as registration telephone number 2 (at 1511), the telephone number to be stored as the 611 assistance number (at 1513), and the individual bits which program the lock options and timing of the mobile unit (at 1515). of course, it is possible to remotely program any of the numbers and options held in microprocessor 401 EEPROM as illustrated in FIGS. 15A and 15B. The message may be concatenated in a string as shown or they may be sent one at a time with other messages interspersed.

Figure 16:
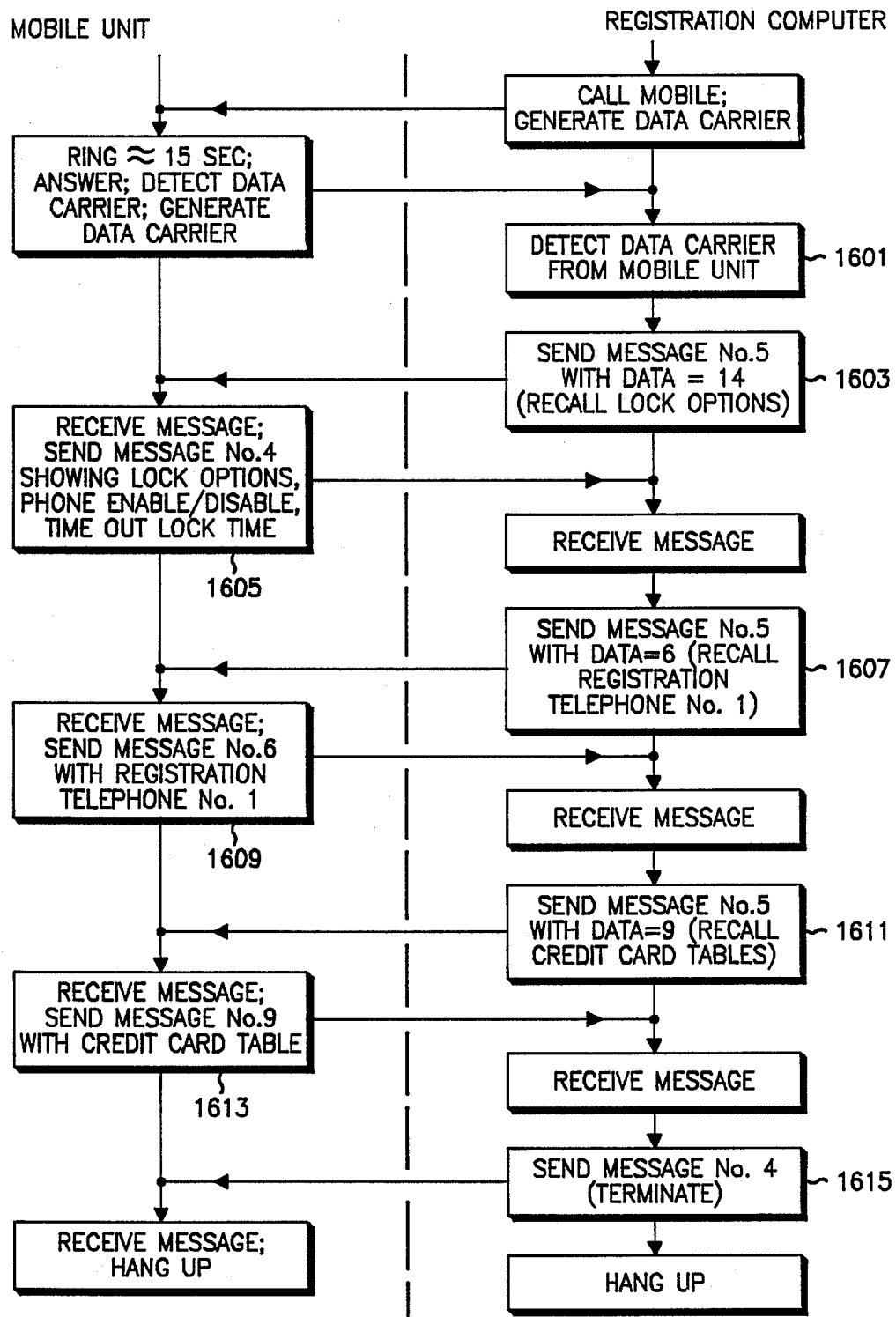
FIG. 16 is a flowchart of the process employed by the present invention to remotely retrieve the contents of a selected mobile unit memory location and transmit the contents to the registration computer.

The status of any of the stored numbers or options may be queried as shown in FIG. 16. The call is made from the registration computer 107 and acknowledged by the mobile unit as previously described. After detection of the data carrier from the mobile unit (at 1601), a message—for example message #5—is transmitted from the registration computer (at 1603) to the mobile unit. Included with the message #5 is a data byte of 14. The mobile unit responds to the reception of the message by reviewing the contents of the memory locations corresponding to the lock options (which is the meaning of data byte 14) and sending the lock option status, phone enable/disable status, and time out lock time to the registration computer (at 1605). The status of other options may be requested serially or interspersed with other data. As shown, a message #5 with a data byte 6 causes the mobile unit to respond with the contents of the memory location corresponding to the registration telephone number 1 (at 1607, 1609) and a message #5 with data byte 9 causes the mobile unit to respond with the stored credit card table (at 1611,1613). When the requested status is complete, a terminate message #4 is transmitted to the mobile unit (at 1615) and both the mobile unit and the registration computer hang up.

In summary, then, the method and apparatus for communicating credit card information for payment of mobile radiotelephone calls has been shown and described. A credit card magnetic stripe is read and a data field is created containing information such as the credit card identification number. This data field is then formatted into a variable length data transmission format which has cyclic redundancy and longitudinal redundancy suitable for protection of the data field against transmission errors introduced during radio transmission. Therefore, while a particular embodiment of the invention has been shown and described, it should be understood that the invention is not limited thereto since modifications unrelated to the true spirit and scope of the invention may be made by those skilled in the art. It is therefore contemplated to cover the present invention and any and all such modifications by the claims of the present invention.

We claim:

1. A method for communicating credit card information from a mobile radiotelephone unit to a radiotelephone system in which a radiotelephone call from the mobile unit will be authorized if the costs of the radiotelephone call may be charged against a valid credit card, comprising the steps of:

reading a credit card identification number and creating a data field therefrom at the mobile unit;
generating a message having a format comprising:
 (a) an opening flag of at least one start-of-header (SOH) character,
 (b) a data length character,
 (c) a message type character,
 (d) said created data field,
 (e) at least one cyclic redundancy code character, and
 (f) at least one longitudinal redundancy check character; and
transmitting said generated message from a transmitter of the mobile unit.

2. A method in accordance with the method of claim 1 further comprising the step of retransmitting said generated message in response to a negative acknowledge signal being received at a receiver of the mobile unit.

3. A method in accordance with the method of claim 1 wherein said step of reading a credit card identification number further comprises the step of reading a credit card expiration date.

4. A method in accordance with the method of claim 1 wherein said at least one cyclic redundancy code character of said generated message is further generated from said data length character, said message type character, and said created data field.

5. A method in accordance with the method of claim 1 wherein said at least one longitudinal redundancy check character of said generated message is further generated from said data length character, said message type character, said created data field, and said at least one cyclic redundancy code character.

6. The apparatus for communicating credit card information from a mobile radiotelephone unit to a radiotelephone system in which a radiotelephone call from the mobile unit will be authorized if the costs of the radiotelephone call may be charged against a valid credit card, comprising:
    means for reading a credit card identification number and creating a data field therefrom at the mobile unit;
    means for generating a message having a format comprising:
        (a) an opening flag of at least one start-of-header (SOH) character,
        (b) a data length character,
        (c) a message type character,
        (d) said created data field,
        (e) at least one cyclic redundancy code character, and
        (f) at least one longitudinal redundancy check character; and
    means for transmitting said generated message from the mobile unit.

7. The apparatus for communicating credit card information in accordance with claim 6 further comprising means for retransmitting said generated message in response to a negative acknowledge signal being received at a receiver of the mobile unit.

8. The apparatus for communicating credit card information in accordance with claim 6 wherein said means for reading a credit card identification number further comprises means for reading a credit card expiration date.

9. The apparatus for communicating credit card information in accordance with claim 6 further comprising means for generating said at least one cyclic redundancy code character of said generated message from said data length character, said message type character, and said created data field.

10. The apparatus for communicating credit card information in accordance with claim 6 further comprising means for generating said at least one longitudinal redundancy check character of said generated message from said data length character, said message type character, said created data field, and said at least one cyclic redundancy code character.

11. A method for communicating credit card information via a radiotelephone system having a plurality of mobile units with radio transceivers, at least one base site transceiver, and a registration computer in which a radiotelephone call from a requesting mobile unit will be authorized if the costs of the radiotelephone call may be charged against a valid credit card, comprising the steps of:
    reading a credit card identification number and creating a data field therefrom at one of the mobile units;
    generating a message having a format comprising:
        (a) an opening flag of at least one start-of-header (SOH) character,
        (b) a data length character,
        (c) a message type character,
        (d) said created data field,
        (e) at least one cyclic redundancy code character, and
        (f) at least one longitudinal redundancy check character;
    transmitting said generated message from a transmitter of said one of the mobile units;
    receiving said transmitted generated message at a receiver of said at least one base site transceiver;
    calculating at least one local cyclic redundancy code character and at least one local longitudinal redundancy check character at the registration computer;
    comparing said calculated local cyclic redundancy code character to said at least one generated message cyclic redundancy code character and comparing said at least one calculated local longitudinal redundancy check character to said at least one generated message longitudinal redundancy check character;
    transmitting an acknowledge signal from a transmitter of said at least one base site transceiver if said comparison of said cyclic redundancy code characters indicates a substantial identity of characters and if said comparison of said longitudinal redundancy check characters indicates a substantial identity of characters;
    transmitting a negative acknowledge signal from a transmitter of said at least one base site transceiver if said comparison of said cyclic redundancy code characters and said longitudinal redundancy check characters indicates a mismatch of either character; and
    retransmitting said generated message, in response to said negative acknowledge signal being received at a receiver of said one of the mobile units.

12. A method in accordance with the method of claim 11 wherein said step of reading a credit card identification number further comprises the step of reading a credit card expiration date.

13. A method in accordance with the method of claim 11 wherein said at least one cyclic redundancy code character of said generated message is further generated from said data length character, said message type character, and said created data field.

14. A method in accordance with the method of claim 11 wherein said at least one longitudinal redundancy check character of said generated message is further generated from said data length character, said message type character, said created data field, and said at least one cyclic redundancy code character.

15. A method in accordance with the method of claim 11 further comprising the steps of:
    receiving said acknowledge signal at said one of the mobile units;

timing the time after said transmission of said generated message from said one of the mobile units; and retransmitting said generated message if said acknowledge signal is not received within a predetermined time measured by said timing step.

16. The apparatus for communicating credit card information via a radiotelephone system having a plurality of mobile units with radio transceivers, at least one base site transceiver, and a registration computer in which a radiotelephone call from a requesting mobile unit will be authorized if the costs of the radiotelephone call may be charged against a valid credit card, comprising:

means for reading a credit card identification number and creating a data field therefrom at one of the mobile units;

means for generating a message having a format comprising:
  (a) an opening flag of at least one SOH character,
  (b) a data length character,
  (c) a message type character,
  (d) said created data field,
  (e) at least one cyclic redundancy code character, and
  (f) at least one longitudinal redundancy check character;

means for transmitting said generated message from said one of the mobile units;

means for receiving said transmitted generated message at said at least one base site transceiver;

means for calculating at least one local cyclic redundancy code character and at least one local longitudinal redundancy check character at the registration computer;

means for comparing said calculated local cyclic redundancy code character to said at least one generated message cyclic redundancy code character and comparing said at least one calculated local longitudinal redundancy check character to said at least one generated message longitudinal redundancy check character;

means for transmitting an acknowledge signal from said at least one base site transceiver if said comparison of said cyclic redundancy code characters indicates a substantial identity of characters and if said comparison of said longitudinal redundancy check characters indicates a substantial identity of characters;

means for transmitting a negative acknowledge signal from said at least one base site transceiver if said comparison of said cyclic redundancy code characters and said longitudinal redundancy check characters indicates a mismatch of either character; and means for retransmitting said generated message, in response to said negative acknowledge signal being received at a receiver of said one of the mobile units.

17. The apparatus for communicating credit card information in accordance with claim 16 wherein said means for reading a credit card identification number further comprises means for reading a credit card expiration date.

18. The apparatus for communicating credit card information in accordance with claim 16 further comprising means for generating said at least one cyclic redundancy code character of said generated message from said data length character, said message type character, and said created data field.

19. The apparatus for communicating credit card information in accordance with claim 16 further comprising means for generating said at least one longitudinal redundancy check character of said generated message from said data length character, said message type character, said created data field, and said at least one cyclic redundancy code character.

20. The apparatus for communicating credit card information in accordance with claim 16 further comprising:

means at said one of the mobile units for receiving said acknowledge signal;

means for timing the time after said transmission of said generated message from said one of the mobile units; and means for retransmitting said generated message if said acknowledge signal is not received within a predetermined time measured by said means for timing.

* * * * *